United States Patent
Abe et al.

(10) Patent No.: US 6,205,636 B1
(45) Date of Patent: Mar. 27, 2001

(54) AUTOMATIC ASSEMBLY APPARATUS AND AUTOMATIC ASSEMBLY METHOD

(75) Inventors: Toshiki Abe, Fukuoka; Norifumi Eguchi, Saga; Hiroshi Ariyoshi, Fukuoka, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/387,552

(22) Filed: Sep. 1, 1999

(30) Foreign Application Priority Data

Sep. 2, 1998 (JP) .................................................. 10-248062

(51) Int. Cl.$^7$ ........................... G05B 19/18; B23Q 15/12; B23Q 15/14
(52) U.S. Cl. ............................. 29/407.1; 29/701; 29/720; 29/834; 700/59; 700/194; 700/259; 348/87
(58) Field of Search ........................... 29/407.01, 407.04, 29/407.09, 407.1, 714, 720, 759, 833, 834, 701; 700/257, 259, 59, 194; 348/87; 382/151

(56) References Cited

U.S. PATENT DOCUMENTS

| | | | |
|---|---|---|---|
| 4,712,970 | * | 12/1987 | Nakamura et al. . |
| 4,757,550 | * | 7/1988 | Uga . |
| 4,980,971 | * | 1/1991 | Bartschat et al. ...................... 29/833 |
| 5,172,468 | * | 12/1992 | Tanaka et al. .......................... 29/833 |
| 5,265,170 | * | 11/1993 | Hine et al. . |
| 5,383,270 | * | 1/1995 | Iwatsuka et al. ...................... 29/840 |
| 5,787,577 | * | 8/1998 | Kent ....................................... 29/833 |
| 5,946,408 | * | 8/1999 | Honda . |
| 6,016,599 | * | 1/2000 | Morita et al. .......................... 29/833 |
| 6,026,172 | * | 2/2000 | Lewis, Jr. et al. . |

FOREIGN PATENT DOCUMENTS 4-353704 * 12/1992 (JP) .

* cited by examiner

Primary Examiner—S. Thomas Hughes
Assistant Examiner—Eric Compton
(74) Attorney, Agent, or Firm—Wenderoth, Lind & Ponack L.L.P.

(57) ABSTRACT

A die bonder equipped with an image recognition unit having a zoom optical system for placing a chip to a correct location in accordance with recognition results delivered from the image recognition unit. Data related with the recognition offset data that specify a relationship in the relative location between optical coordinates system and mechanical coordinates system, and the pixel rate, etc. are stored in advance in a correction magnification index memory section, maintaining linkage to respective zoom magnification indices. Results of recognition are converted from a location information in terms of an optical coordinates system into a location information in actual dimensions in terms of a mechanical coordinates system of the die bonder, using a datum selected among the data in accordance with a magnification index at which the chip was pictured by a camera of an image recognition section. The data setting operations, which were required to be done at each time when the zoom magnification rate is changed, are made automatically to an increased operational advantage.

12 Claims, 18 Drawing Sheets

FIG. 7

| MAGNIFI-CATION INDEX | PIXEL RATE | | REFERENCE MARK (RECOGNITION OFFSET) | | ZOOM COORD-INATES |
|---|---|---|---|---|---|
| n | Px | Py | Cx | Cy | Z |
| 1.00 | 0.00000 | 0.00000 | 00.0000 | 00.0000 | 0000.00 |
| 0.95 | 0.00000 | 0.00000 | 00.0000 | 00.0000 | 0000.00 |
| 0.90 | 0.00000 | 0.00000 | 00.0000 | 00.0000 | 0000.00 |
| 0.85 | 0.00000 | 0.00000 | 00.0000 | 00.0000 | 0000.00 |
| 0.35 | 0.00000 | 0.00000 | 00.0000 | 00.0000 | 0000.00 |
| 0.20 | 0.00000 | 0.00000 | 00.0000 | 00.0000 | 0000.00 |

54 — MAGNIFICATION INDEX
55 — PIXEL RATE
56 — REFERENCE MARK (RECOGNITION OFFSET)
57 — ZOOM COORDINATES

AUTOMATIC ASSEMBLY APPARATUS AND AUTOMATIC ASSEMBLY METHOD

FIELD OF THE INVENTION

The present invention relates to an automatic assembly apparatus which places a component to the right location based on results of a recognition operation made by an image recognition unit. The invention relates also to a method of automatic assembly.

BACKGROUND OF THE INVENTION

In the assembly of electronic components and other such parts on a substrate, where high accuracy in the location alignment is required, an image recognition method has often been employed for detecting the location. Many of the automatic assembly apparatus for electronic components have a built-in image recognition unit for aligning components to a correct location for assembly based on the results of recognition made by the image recognition unit. The image recognition unit comprises an optical system for obtaining an image of the recognition object. Information on location of a recognition object expressed in terms of an optical coordinates system detected by the optical system needs to be converted into information of a mechanical coordinates system maintaining a strict correspondence with the optical information. For conducting a conversion process, offset data representing a relative relationship in the location between the two coordinate systems and a pixel rate, which is a dimensional conversion coefficient between the pixel counts in term of optical coordinates and the actual dimensions in term of mechanical coordinates, are set and registered at the initial stage. In an image recognition unit having a fixed optical system, the initial registration is made at the time when an image recognition unit is incorporated in an automatic assembly apparatus, and does not require any modification in the contents of registration thereafter, unless the optical system is replaced.

In some automatic assembly apparatuses that handle objects different dimensions, for example a die bonder, an image recognition unit often employs a zoom lens system. An appropriate magnification index is determined for the zoom lens system in accordance with the size of a recognition object. In the conventional automatic assembly apparatus, the magnification index is decided by an operator; who determines it watching an object on a monitor screen based on his, or her, intuition and past experience. When the zoom magnification index is changed, the consequence of which is identical to the change of an optical system, the registration of the offset data and the pixel rate and other relevant data has to be renewed at each time. Setting and registration of the magnification index, offset data, and pixel rate, etc., require quite an expertise and work hours. Namely, it has been quite a burden for a line operator, and an improvement in that respect has been looked for.

The present invention addresses the above described problems, and intends to offer an automatic assembly apparatus and the method with which the burden of line operators is alleviated and the quality of operation is improved.

SUMMARY OF THE INVENTION

An automatic assembly apparatus in accordance with the present invention comprises a memory section for storing and maintaining a linkage to respective magnification indices of a zoom lens of zoom optical system, a plurality of recognition offset data that specify a relationship in the relative location between the optical coordinates system of an image recognition unit and the mechanical coordinates system of an automatic assembly apparatus incorporating the image recognition unit, a selection section for selecting in accordance with the zoom magnification index one datum among the plurality of recognition offset data stored in the memory section, a recognition process section for recognizing the image of an object of recognition pictured through a camera and outputting the results of recognition in the form of at least a location information in terms of an optical coordinates system, a coordinates conversion section for converting the location information into a location information in terms of mechanical coordinates system using a recognition offset datum selected, and a control section for controlling an automatic assembly apparatus in accordance with the converted location information.

A method of automatic assembly in accordance with the present invention comprises storing and maintaining a linkage to respective magnification indices of a zoom lens of zoom optical system, a plurality of recognition offset data that specify a relative location between the optical coordinates system of an image recognition unit and the mechanical coordinates system of an automatic assembly apparatus incorporating the image recognition unit, selecting in accordance with the zoom magnification index one datum among the plurality of recognition offset data stored in the memory section, recognizing the image of an object of recognition pictured through a camera in a recognition process section and outputting the results of recognition in the form of at least a location information in terms of optical coordinates system, converting the location information into a location information in terms of mechanical coordinates system using a recognition offset datum selected, and controlling an automatic assembly apparatus in accordance with the converted location information.

In an automatic assembly apparatus in accordance with the present invention, the recognition offset data that specify a relationship in the relative location between the optical coordinates system of an image recognition unit and the mechanical coordinates system of an automatic assembly apparatus incorporating the image recognition unit have been stored in a memory maintaining a linkage to the magnification index of a zoom optical system. Location information obtained through a camera is converted into information in terms of a mechanical coordinates system based on a recognition offset datum selected in accordance with a magnification index at which the camera pictured the image. As a result, when a zoom magnification index is changed to another magnification index that fits the size of a recognition object, the data registration operations accompanied by the change are conducted automatically to an improved operational efficiency. This also eliminates the dispersion by individual operators, which dispersion was inevitable when registration of such data was renewed by the hand of operators at their own discretion. Thus, the results of an image recognition are provided in a stable and reliable manner.

BRIEF DESCRIPTION OF THE DRAWINGS

FIG. 7 shows a data table registered in the image recognition unit.

DETAILED DESCRIPTION OF THE INVENTION

Figure 1:
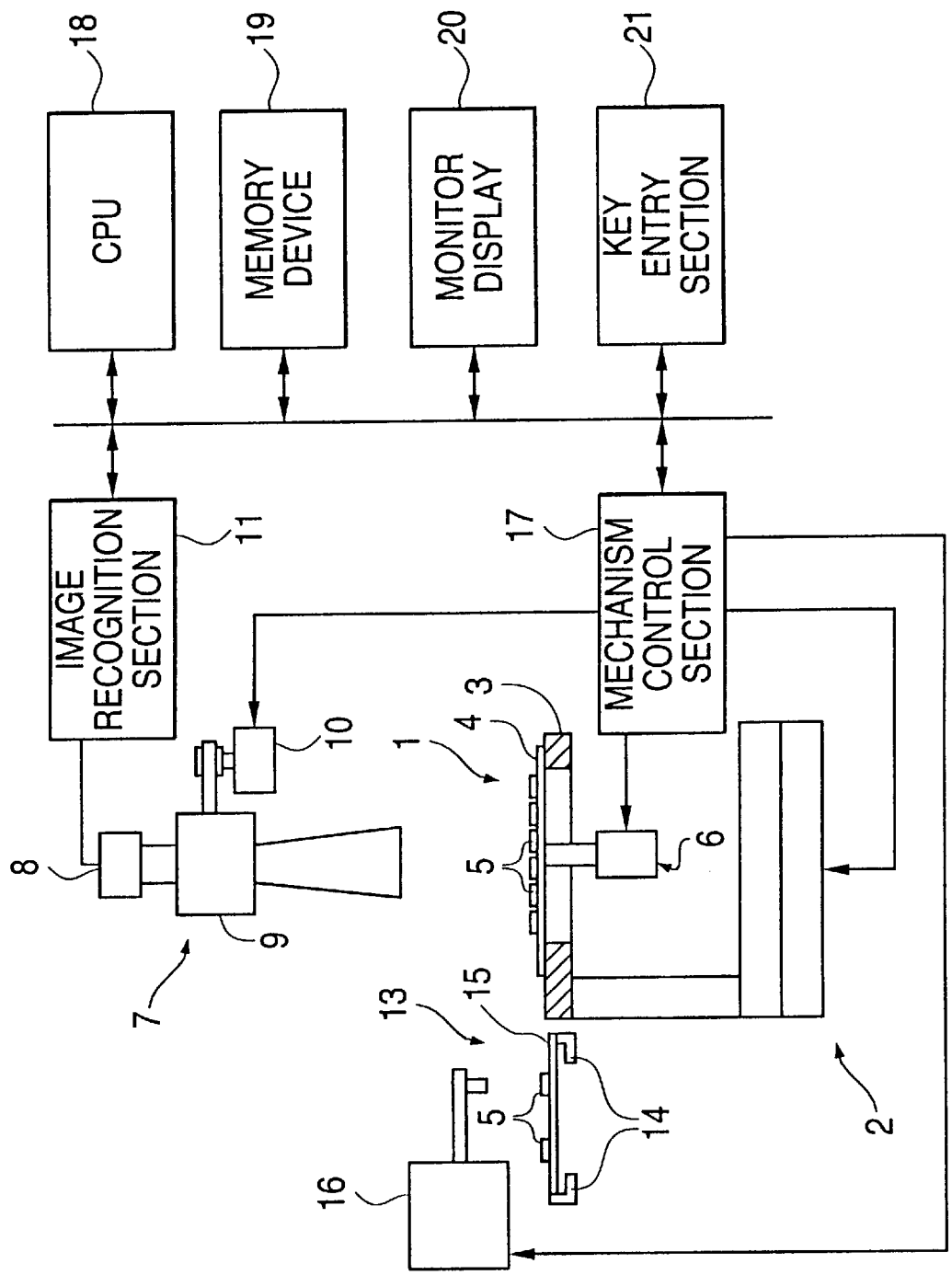
FIG. 1 is a block diagram of an automatic assembly apparatus in accordance with an exemplary embodiment of the present invention.

With reference to FIG. 1, the structure of a die bonder is described as an apparatus representing the automatic assembly apparatus. In FIG. 1, a chip supply section 1 comprises a wafer ring 3, which is moved in the horizontal direction by an XY table 2. The wafer ring 3 is provided with a wafer sheet 4, on which a number of chips 5 are attached. Provided underneath the wafer ring 3 is a die ejector 6, which pushes up a chip 5 disposed on the wafer sheet 4 breaking the wafer sheet 4 (ref. FIG. 18). The center of die ejector 6 has been adjusted to coincide with the pick-up location of a nozzle of bonding head 16 picking up a chip.

Above the chip supply section 1, an image taking section 7, or the image taking means, is provided. The image taking section 7 comprises a camera 8 and a zoom optical system 9, and a zoom motor 10 changes the zoom magnification index of the zoom optical system 9 to picture an image of chip 5 disposed on the wafer sheet 4 at a certain specified magnification index. The image data taken is delivered to an image recognition section 11, or the recognition process section, and the location of a chip 5 as the object of recognition is recognized there.

The results of recognition are delivered as a location information in terms of the optical coordinates system of the image taking section 7. The location information is converted into a location information in terms of a coordinates system of the die bonder. The XY table 2 is driven in accordance with the location information in order to bring the center of a chip 5 to the center of die ejector 6. Namely, the chip 5, or a component, is brought, in accordance with the recognition results, to a location where it is to be picked up by the bonding head 16.

At a side of the chip supply section 1, a substrate positioning section 13 is provided. A substrate 15 carried on a transfer path 14 is aligned to a correct position. The bonding head 16 picks up a chip 5, which has been placed on correct location through the location recognition and pushed up by the die ejector 6, and transfers the chip to the substrate positioning section 13 to have it bonded on the substrate 15 already positioned the correct location. Namely, the die bonder is an automatic assembly apparatus that aligns a component to the correct location in accordance with the results of recognition.

Now, the structure of a control system is described. A mechanism control section 17 controls the operations of the XY table 2, the die ejector 6, the zoom motor 10 and the bonding head 16. A CPU 18 is in charge of the overall control. In addition to the overall control of the bonding operation of a die bonder, the CPU makes calculations needed for the initial registration process in an image recognition and for the teaching process to automatically obtain chip data, or the object of recognition. A memory device 19 stores various data, such as programs needed to perform respective processing operations, such as bonding operation, data at the initial registration in the image recognition, data taken-in during teaching of chip recognition operation, and other such data. A monitor display 20 displays the operations on a screen during the teaching process and the data input process as well as an image pictured by the image taking section 7. A key entry section 21 signifies a keyboard and a pointing device on a display screen (touch panel), which enters data during the operations and the teaching.

In FIG. 1, the image taking section 7 and the image recognition section 11, and those portions related to image recognition among the CPU 18, the memory device 19, the monitor display 20, the key entry section and the mechanism control section 17 constitute the image recognition unit. How the image recognition unit functions is described in the following with reference to FIG. 2.

Figure 2:
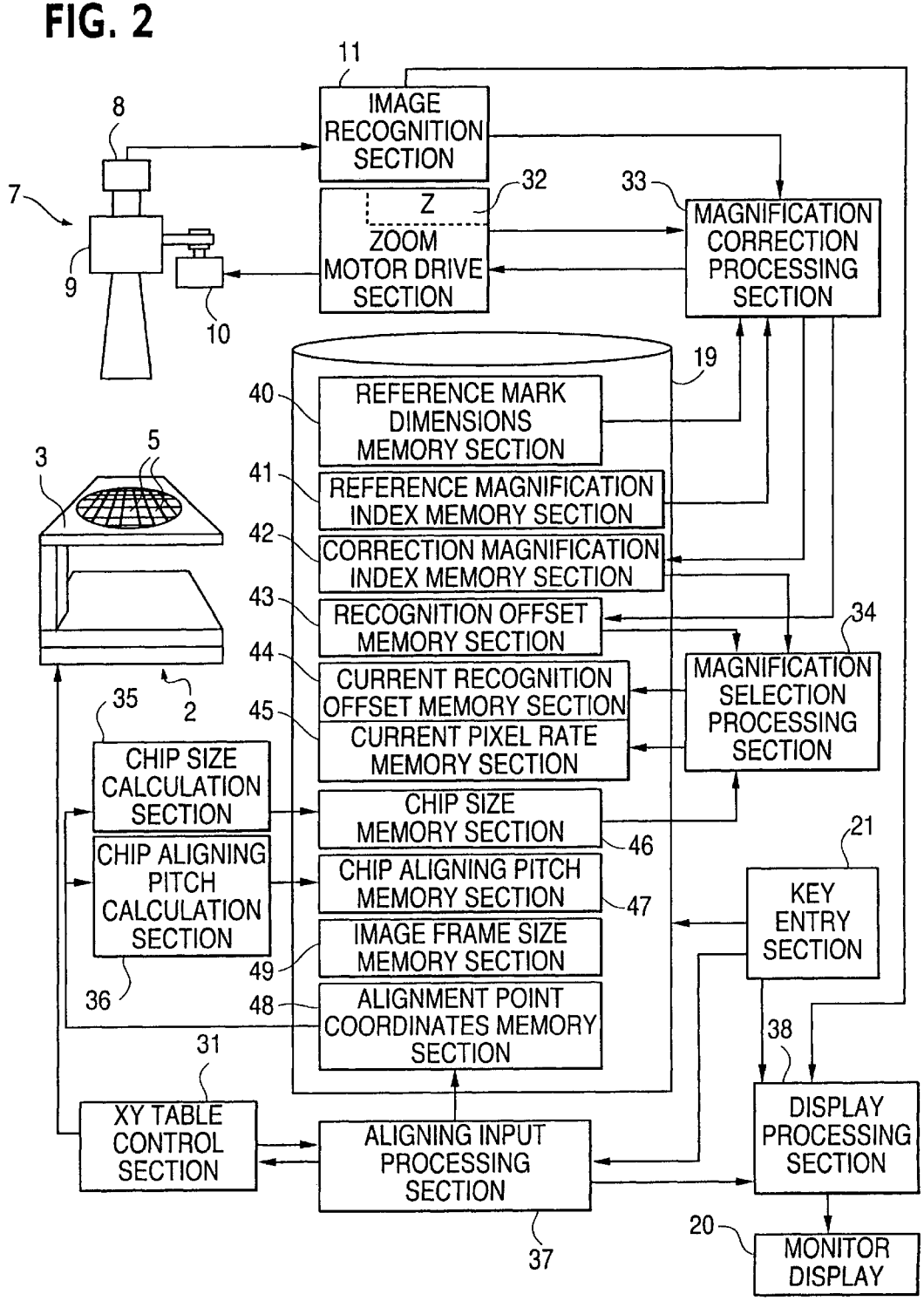
FIG. 2 is a functional block diagram of the automatic assembly apparatus, showing the respective processing functions.

In the first place, the correspondence between the structures of an apparatus shown in FIG. 1 and the function blocks shown in a chart of FIG. 2 are described. A zoom motor drive section 30 and an XY table control section 31 of FIG. 2 correspond to the mechanism control section 17 of FIG. 1. A magnification correction processing section 33, a magnification selection processing section 34, a chip size calculation section 35, a chip aligning pitch calculation section 36, an aligning input processing section 37, and a display processing section 38 are those included within a function range of the CPU 18 in FIG. 1.

A reference mark dimensions memory section 40, a reference magnification index memory section 41, a correction magnification index memory section 42, a recognition offset memory section 43, a current recognition offset memory section 44, a current pixel rate memory section 45, a chip size memory section 46, a chip aligning pitch memory section 47, an alignment point coordinates memory section 48, and an image frame size memory section 49 constitute the content of memory stored in the memory device 19 of FIG. 1.

How each of the above items functions is described in the following. The zoom motor drive section 30 drives a zoom motor 10 for changing the zooming index Z of a zoom optical system 9. The XY table control section 31 controls the motion of XY table 2 to shift the location of wafer ring 3 in a horizontal plane. Numeral 32 represents a counter for indicating the current state of the zoom optical system 9; which counter indicates an absolute quantity of revolution of zoom motor 10 counted from the original point in the form of pulse counts. The magnification correction processing section 33 collects data required for correcting the pixel rate and the recognition offset error, which have become necessary as a result of a change in the zoom magnification index.

Practically, a reference mark having known dimensions is pictured through a camera and the dimensions are actually measured on an image to compile a data table of measured pixel rate and recognition offset value designated at each of the respective zoom magnification indices; which table is stored in a memory.

The magnification selection processing section 34 automatically determines a suitable zoom magnification index in accordance with the size of a recognition object so that an image recognition operation is performed in an ideal state, and selects a recognition offset datum among those stored in memory means based on the determined zoom magnification index. In practice, a zoom magnification index is automatically determined so that an image of chip 5 pictured by a camera 8 is displayed within a frame (the frame indicated by numeral 60 in FIGS. 6 and 10) of monitor display, at a predetermined size (for example, approximately half the frame size). And, a pixel rate and a recognition offset value corresponding to the determined zoom magnification index are selectively read out of the memory means, or the correction magnification index memory section 42 and the recognition offset memory section 43; which values are stored in a memory as the current values. Namely, the magnification selection processing section 34 is the means for determining a pixel rate and a zoom magnification index in accordance with the size of a recognition object, at the same time it is the means for selecting a recognition offset datum based on the zoom magnification index.

The aligning input processing section 37 inputs coordinates of a chip corner shown on the monitor display through key entry section 21. The chip size calculation section 35 calculates the size of a chip, namely the size in the X and Y directions, from the chip corner coordinates made available by the aligning input processing. The chip aligning pitch calculation section 36 calculates chip aligning pitch from the chip corner coordinates of two adjacent chips. The display processing section 38 processes data to be displayed on the screen, such as an image of a chip pictured through a camera, operating instructions for data input procedure, alignment input procedure, etc.

Now, contents of data stored in the memory device 19 are described. Among those stored in the memory device, the following items of data are read out from time to time whenever they are needed for performing the above described respective processes. The reference mark dimensions memory section 40 stores known dimensions of a reference mark to be used for the magnification correction; specifically in the present case, the diameter of a hole of an exclusive jig, which is attached on the die ejector 6, to be pictured by a camera is stored. Data stored in the reference mark dimensions memory section 40 are used for correcting the magnification index. The reference magnification index memory section 41 stores a reference pixel rate Po, which is a conversion coefficient between the actual dimensions on design data and the pixel counts, as well as zoom coordinates Zo, which provides a zoom magnification index n on design data, corresponding to respective magnification indices provided at a certain predetermined interval. The above data are used also for the magnification index correction.

The correction magnification index memory section 42 stores data on measured pixel rate Px, Py and zoom coordinates Z adopted at the magnification index correction processing based on the results of actual measurement, with linkage to each zoom magnification index n. The recognition offset memory section 43 is the memory means for storing recognition offset data; which stores, with linkage to each zoom magnification index n, a recognition offset value, which represents a relationship in the relative location between an optical coordinates system of image recognition unit and a mechanical coordinates system of die bonder made available through actual measurement. The current recognition offset memory section 44 stores a current value of the recognition offset value which has been taken in as the consequence of a selection of zoom magnification index n at the magnification selecting process. The current pixel rate memory section 45 stores likewise a current value of the pixel rate which has been taken in as the consequence of a selection of the zoom magnification index.

The chip size memory section 46 stores data of the size of a chip 5 calculated by the chip size calculation section 35 from the alignment point coordinates made available by aligning input. Therefore, the chip size memory section 46 is object size memory means for storing the size of recognition object. The chip aligning pitch memory section 47 stores data on an alignment pitch between the adjacent chips 5 calculated likewise by the chip aligning pitch calculation section 36 from the alignment point coordinates. The alignment point coordinates memory section 48 stores data of corner point coordinates of chip 5 specified by the aligning input on a display screen.

The image frame size memory section 49 is the image frame size memory means, which stores data of the size of a frame (indicated by numeral 60 in FIGS. 6 and 10) in terms of pixel counts; an image pictured by a camera 8 is shown within the frame. For the purpose of displaying an image taken by a camera 8 over an entire area of the monitor display 20 without being limited by the frame, the image frame size memory section 49 stores data of the size of monitor display 20.

Figure 3:
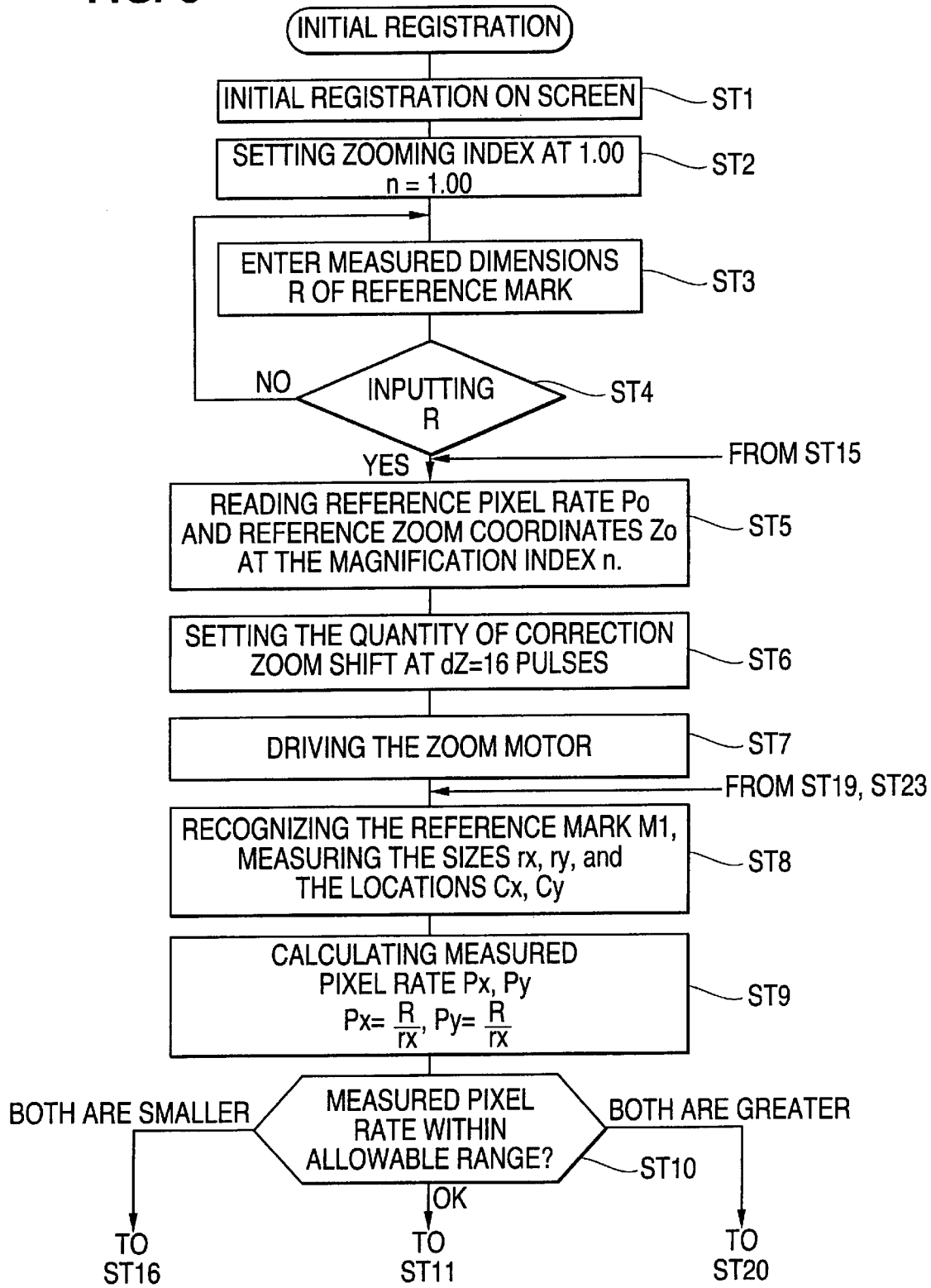
FIG. 3, FIG. 4 and FIG. 5 are process flow charts showing procedure of the initial registration operation in an image recognition unit of the automatic assembly apparatus.

Now in the following, the procedure of the initial registration is described referring to FIGS. 3 through 5. For the initial registration; first, a reference mark of known dimensions is pictured through a camera for specifying mutual relationships of correspondence among the zoom magnification index n, the pixel rate Px, Py, the recognition offset Cx, Cy and the zoom coordinates Z. An exclusive jig having a reference hole of known dimensions is used for the reference mark. The exclusive jig attached on a die ejector 6 is pictured by a camera; the center of the reference hole, or the reference mark, corresponding to the location of picking up a chip 5 by a bonding head is pictured. This corresponds also to the center location of the die ejector 6 adjusted to coincide with the pick up location, namely, the origin of a mechanical coordinates system. The reference mark can be located anywhere so long as its location is known on the mechanical coordinates system and is within a range that can be pictured by the camera 8. The reference mark is not necessarily required to coincide with the origin of the mechanical coordinates system.

Figure 6:
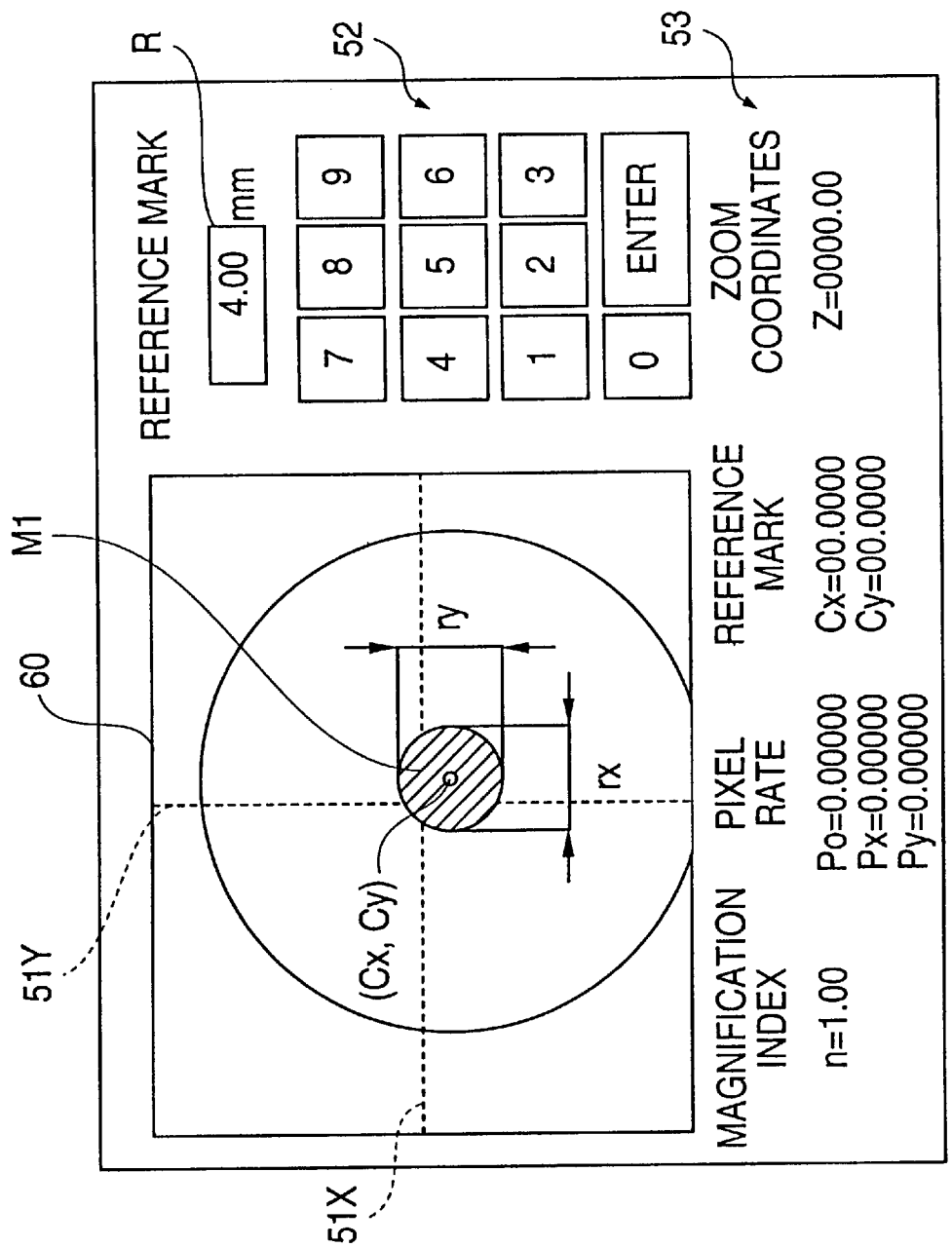
FIG. 6 shows a display screen at the initial registration in the image recognition unit.

The pixel rate is a dimension conversion coefficient for translating the pixel counts on a display screen into actual dimensions; independent pixel rates Px, Py are set respectively in the X and Y directions. The recognition offset Cx, Cy represent coordinates values (Cx, Cy) of the origin (the center of reference mark M1) of the mechanical coordinates system displayed in the optical coordinates system (FIG. 6). This specifies a relationship in the relative location between the optical coordinates system and the mechanical coordinates system.

The values of pixel rate Px, Py and recognition offset Cx, Cy are fixed in a recognition unit that uses a fixed optical system. These values are determined and fixed totally at the time when an assembly apparatus is completed. In an image recognition unit having a zoom optical system, however, these values shift when the zoom magnification index is changed. Therefore, it is essential for a recognition unit that is expected to perform a recognition operation at high precision to grasp in advance the right values that correspond to each of the steps of the zoom magnification index.

Regarding the zoom coordinate Z, it is represented in terms of counter value, or the absolute quantity of revolution of zoom motor 10 indicating the current position of revolution. If a relationship between the zoom coordinate z and respective zoom magnification indices n is stored in a memory, any desired zoom magnification index n can be precisely established by driving the zoom motor 10 in accordance with the counter value.

FIG. 7 is a data table of the above described data. The pixel rate Px, Py, the recognition offset value Cx, Cy, and the zoom coordinate Z are shown at respective zoom magnification indices (the index covering a range 1–0.2, at a pitch 0.05). Providing such a data table in advance enables a conversion process to be performed with an appropriate pixel rate and recognition offset value when the zoom magnification index is changed to meet various sizes of chips, or the recognition objects.

In the following, each of the initial registration process steps for obtaining the above data is described in line with the flow of FIG. 3. A display of initial registration (FIG. 6) appears on the screen (ST1). Zoom magnification index is set at 1.00 (ST2). A request is made to enter the measured dimensions R of reference mark M1 (ST3). Then, an operator enters the dimensions R of reference mark in the column of specified form by operating a keyboard 52 shown in the display of initial registration. The input reference mark dimensions R are stored in the reference mark dimensions memory section 40. Shown in FIG. 6 is an exemplary input of the reference mark M1, namely an exclusive jig having a hole of R=4.00 mm. After the input of reference mark dimensions R is confirmed (ST4), the magnification correction processing section 33 reads out the reference pixel rate Po and the reference zoom coordinate Zo at a magnification index n, from the reference magnification index memory section 41 (ST5).

The reference pixel rate Po is a conversion coefficient between the actual dimensions on design data and the pixel counts; which is represented in actual dimensions per unit pixel ($\mu$m/pixel). The reference zoom coordinate Zo are zoom coordinates that provide a magnification index n on design data; which is represented in the pulse counts that indicate absolute number of revolutions of zoom motor 10 counted from the origin of zoom optical system 9. In practical cases, combining a zoom optical system of image recognition unit with a mechanical coordinates system of die bonder and driving the zoom motor 10 to make a coincidence with the reference zoom coordinate Zo for setting the zoom magnification index at a predetermined magnification index n does not necessarily bring a pixel rate, which is a ratio between the pixel counts obtained through a camera on an optical coordinates system and the actual dimensions, to coincide with the reference pixel rate Po, because of various error factors caused during the manufacture of the unit and apparatus.

Therefore, the following corrections are needed to obtain an actual pixel rate that correctly corresponds to the zoom magnification index n, and the current value of the zoom coordinates Z. The correction is performed in the magnification correction processing section 33. A certain zoom coordinate Z is specified, under which a measured pixel rate, being a ratio between the actual pixel counts on the optical coordinates system and the actual dimensions, is an appropriate approximation of the reference pixel rate. An accurate pixel rate and recognition offset value at that situation are sought. For this purpose, the zoom motor 10 is driven for a certain specific quantity to fine-adjust the zoom magnification index in search of a measured pixel rate, and the value of measured pixel rate thus obtained is compared to the reference pixel rate.

In the first place, a trial operation value for fine-adjusting the zoom magnification index, or a quantity of correction zoom shift dz is set at 16 pulses (ST6), and the counter value of counter 32 is set to coincide with the reference zoom coordinates Zo by driving the zoom motor 10 (ST7). The reference mark M1 is pictured through a camera for the image recognition; the sizes shown in FIG. 6, rx, ry (diameters of the reference hole in the X and Y directions), and, the location of center of reference mark M1, Cx, Cy, are measured (ST8). The image recognition section 11 delivers data on rx, ry as the pixel counts, and data on Cx, Cy as the value on coordinates system of image recognition unit, to the magnification correction processing section 33. Based on the results of measurement and the dimensions R of reference mark which have already been input, the magnification correction processing section 33 calculates measured pixel rate Px, Py through the formula Px=R/rx, Py=R/ry (ST9).

The measured pixel rate Px, Py thus obtained is judged whether or not it is approximately in coincidence with the reference pixel rate Po; namely, whether or not the measured pixel rate Px, Py is within an allowable range with respect to the reference pixel rate Po (ST10). If it is within the allowable range, the measured pixel rate Px,Py is judged to have been in an approximate coincidence with the reference pixel rate Po, and the actual magnification index is in an approximate coincidence with the magnification index set in advance.

Figure 4:
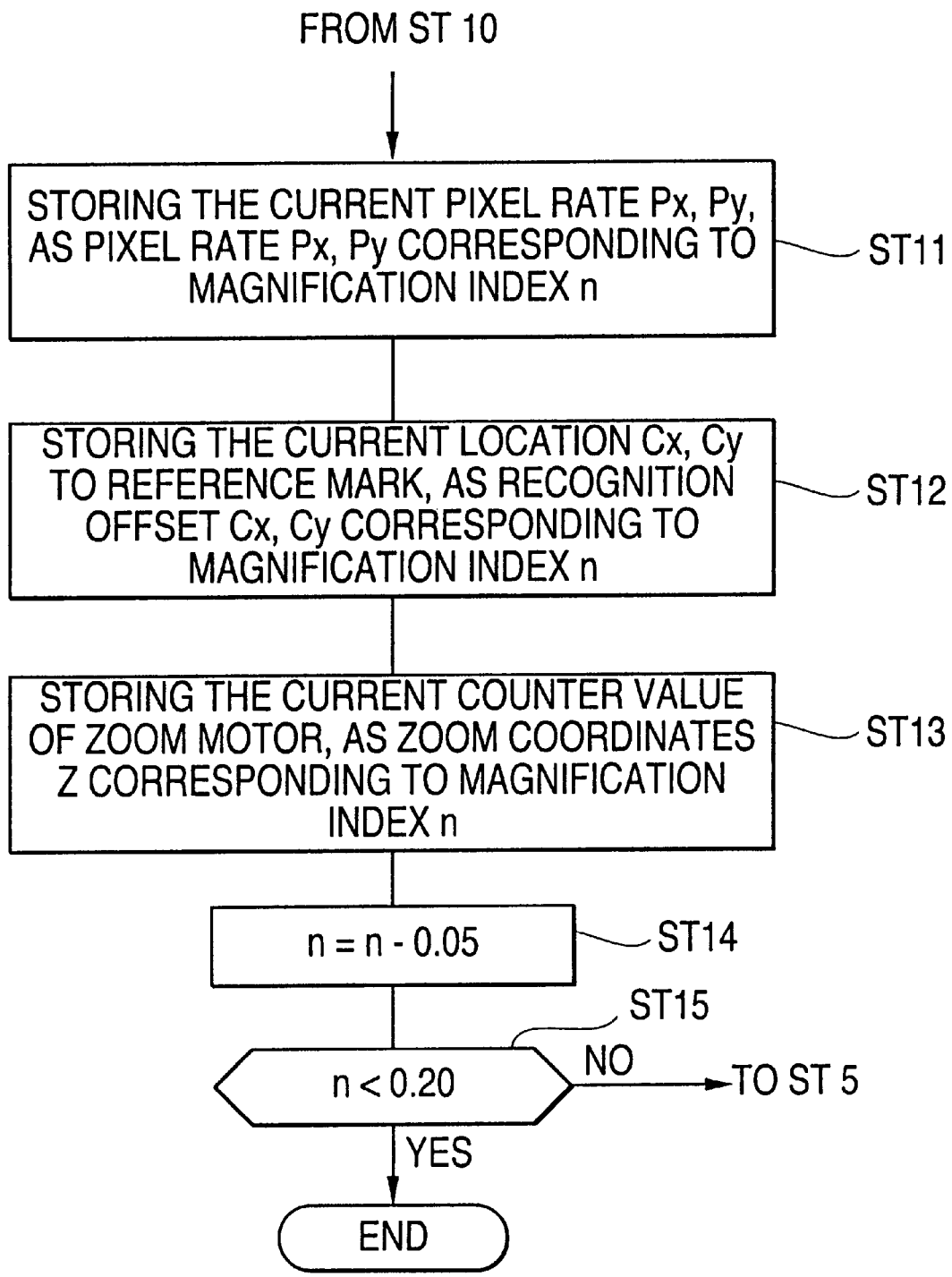
Figure 5:
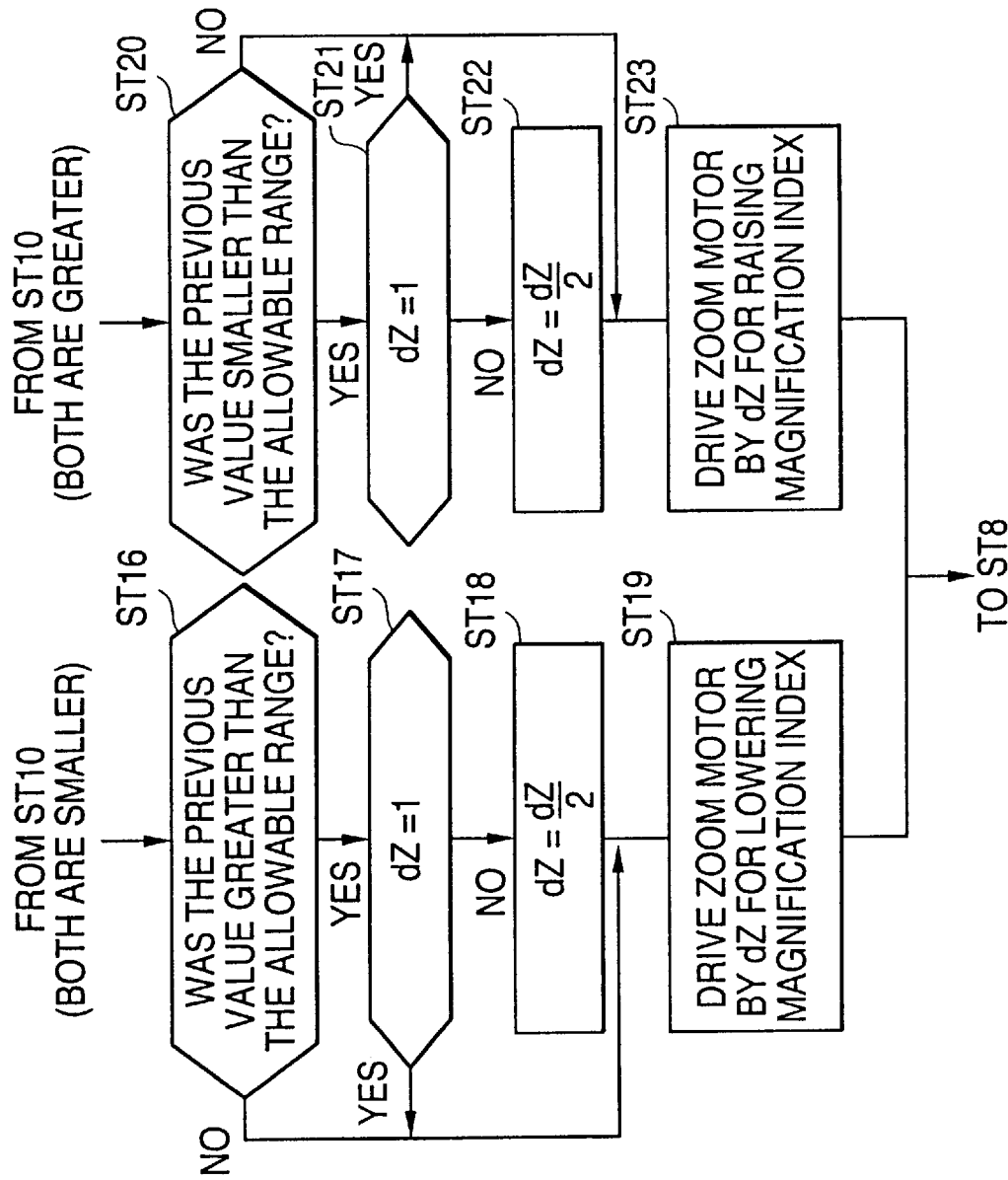

Then the process proceeds to the flow shown in FIG. 4. The measured pixel rate Px, Py currently made available is stored in the correction magnification index memory section 42 as the data of measured pixel rate Px, Py corresponding to the zoom magnification index n (ST11). The current location Cx, Cy of reference mark M1 is stored in the recognition offset memory section 43 as the data of recognition offset Cx, Cy corresponding to zoom magnification index n (ST12). Further, a value of counter 32 indicating the current location of zoom motor 10 is stored in the correction magnification index memory section 42 as the zoom coordinate Z corresponding to zoom magnification index n (ST13).

If shifting of zoom coordinates by zoom motor 10 for the purpose of fine-adjustment of the zoom magnification index n was unnecessary, the reference zoom coordinates are stored as they are in the correction magnification index memory section 42 at ST13. On the other hand, in a case described in the following, the zoom coordinate Z shifts by the quantity of correction zoom shift dz for fine-adjusting the zoom magnification index. Therefore, a corrected zoom coordinate Z is stored in a memory at ST13.

The zoom magnification index n is lowered by 0.05 (ST14), and, in the same procedure as described above, the measured pixel rate Px, Py, the recognition offset Cx, Cy, and the zoom coordinate Z corresponding to the zoom magnification index n are sought to be stored in respective memories. The same procedure is repeated one after the other by lowering the zoom magnification index n each time by a 0.05 pitch, until the zoom magnification index n reaches 0.2. Namely, a judgement is made whether the zoom magnification index n, which has been reduced at a 0.05 pitch, is greater than 0.2 or not (ST15). If the process is greater than 0.2 it is returned to ST5 for undergoing the repeated steps of ST5 through ST13.

Now description is made of such cases where the measured pixel rate Px, Py is judged at ST10 to be out of the allowable range as the result of comparison with the reference pixel rate Po. If both of the items are smaller than the allowable range, the process proceeds to the flow of FIG. 5; there, it is judged whether the previous measured pixel rate, namely the measured pixel rate Px, Py measured at a zoom magnification index n that is greater by 0.05 than the present measurement was greater than the allowable range (ST16). In the case of "NO", namely the previous value is smaller than the allowable range, the zoom motor 10 is driven by the quantity of correction zoom shift dz for lowering the zoom magnification index n (ST19). And then, the process returns to the above described ST8, the reference mark M1 is once again pictured through a camera, in search of measured pixel rate Px, Py.

In ST16, if the value of previous measurement is judged to be greater than the allowable range, the quantity of correction zoom shift dz is reset at ½ that the present value, and shifted for lowering the zoom magnification index, and the reference mark M1 is pictured once again through the camera, and the measured pixel rate Px, Py is compared to the allowable range. Based on the fact that the previously measured value was greater than the allowable range while the present measured value is smaller than the allowable range, the quantity of correction zoom shift dz for approximating the value of measured pixel rate Px, Py to the reference pixel rate Po is judged to have been excessive, and measurement is once again made after resetting the quantity of correction zoom shift dz.

The above described procedure is repeated until the quantity of correction zoom shift dz becomes 1. Namely, whether the quantity of correction zoom shift dz is 1 or not is judged (ST17); if it is still greater than 1, the dz/2 is replaced by a new dz (ST18), and the process proceeds to ST19. The procedure of ST8 and afterwards are repeated. If, the at ST10, measured pixel rate Px, Py is judged to be within the allowable range, the procedure is terminated at that moment.

In a case when both items of the measured pixel rate Px, Py are judged to be greater than the allowable range at ST20, almost the same procedure as in ST16–ST19 is applied. In the present case, however, the zoom motor 10 is driven by lowering the quantity of correction zoom shift dz step after step for increasing the correction zoom magnification index n, the reference mark M1 is pictured once again through a camera, and the measured pixel rate Px, Py is compared to the allowable range. The procedure is repeated (ST20–ST23). Then, the process returns to ST8 of FIG. 3 to repeat the same steps as the above described steps.

As described in the foregoing, the present process of initial registration seeks an appropriate approximation value of reference pixel rate based on designed zoom magnification index, or a pixel rate value that is within an allowable range with respect to the reference pixel rate, and adopts respective data of the recognition offset and the zoom coordinates at that state as recognition offset and zoom coordinates corresponding to the zoom magnification index n. These data are stored in the data table of FIG. 7, which provides data for each zoom magnification index n.

Completing the data table establishes a sole relationship of mutual correspondence between the optical coordinates system of the image recognition unit equipped with a zoom optical system and the mechanical coordinates system of the die bonder, with the zoom magnification index n as the parameter. The measured pixel rate, the recognition offset and the zoom coordinates that correspond to a certain specific zoom magnification index n can be instantaneously read out, and location information of the optical coordinates system is converted into a correct location information on the mechanical coordinates system.

Figure 8:
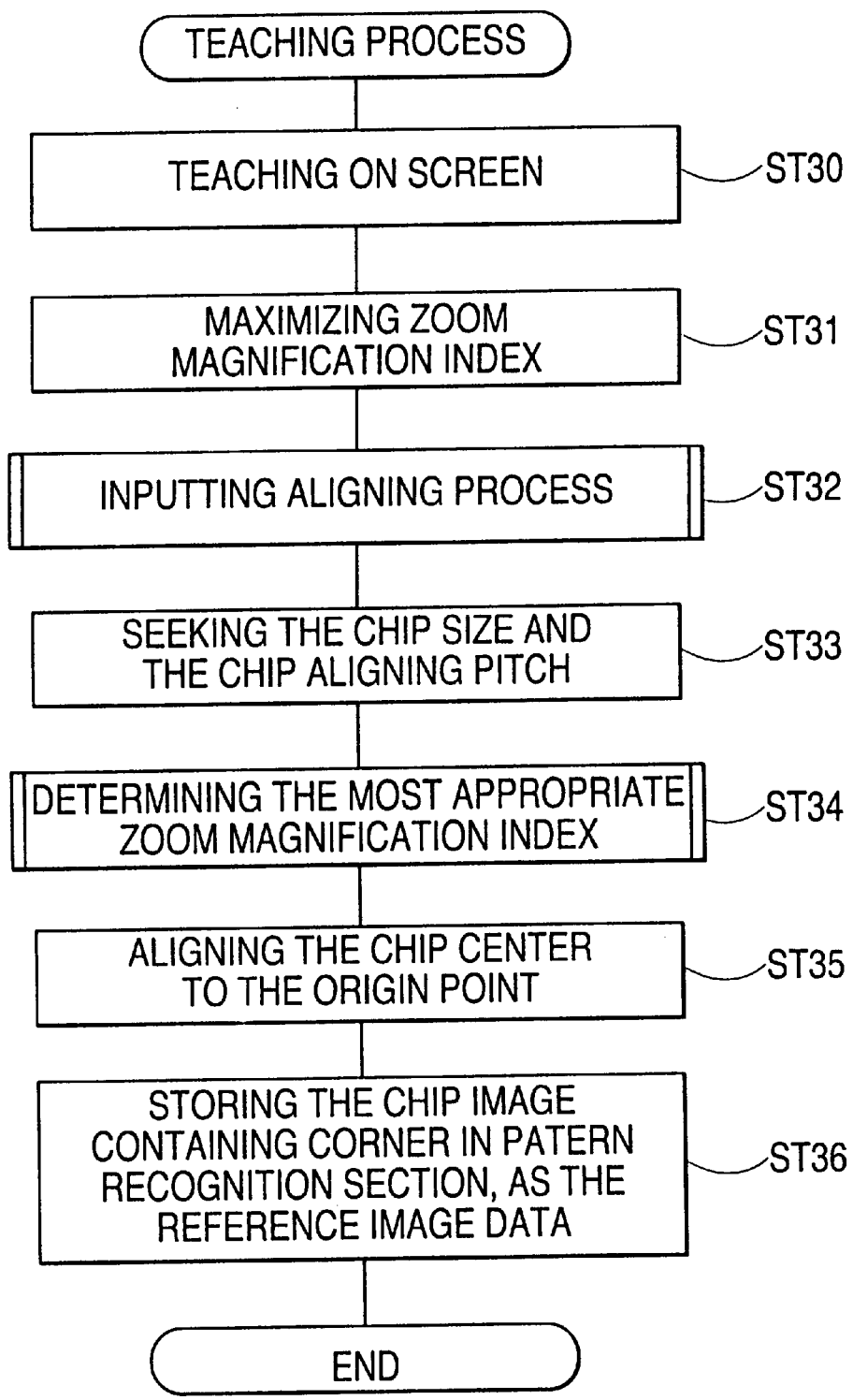
FIG. 8 is a flow chart showing a teaching procedure in the image recognition unit.
Figure 10:
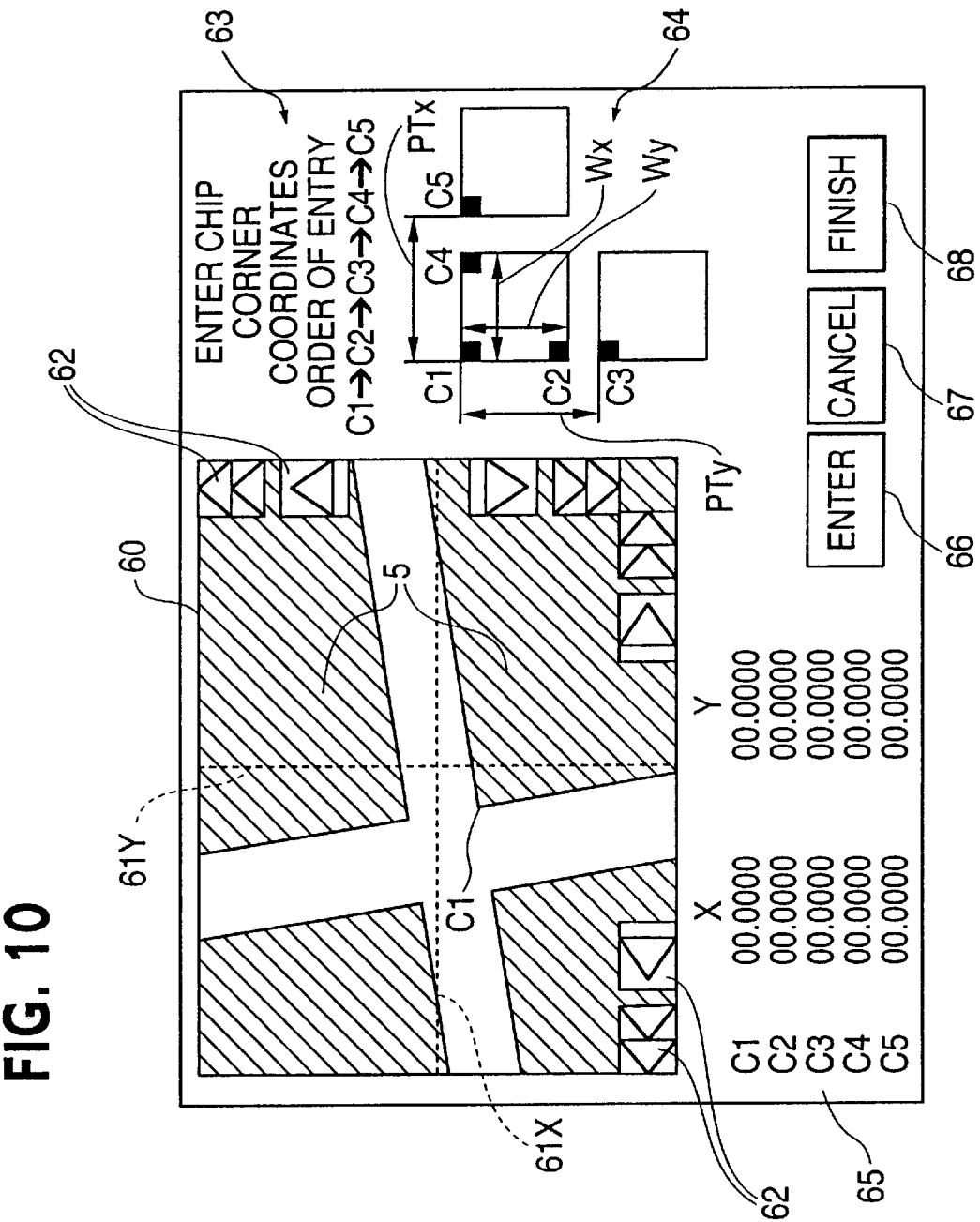
FIG. 10 and FIG. 11 show, respectively, a display screen of the image recognition unit.

Now in the following, a teaching process that is conducted at each time when a bonding chip is replaced with that of different model is described in line with a process flow shown in FIG. 8. This process is for picturing an image of a chip, or an object of recognition, of different dimensions at a most appropriate magnification index, and taking the image thus obtained in as the reference image data for the purpose of location recognition during bonding. In the process flow of FIG. 8, a teaching display as shown in FIG. 10 appears on the monitor display (ST30). The zoom magnification index is maximized (ST31), which is for making the aligning input operation for entering the chip shape and chip dimensions data on the screen easy and accurate. And then, the aligning input processing (to be described later) is performed (ST32), and based on the input the chip size and the chip aligning pitch are sought (ST33).

Based on the input chip size and the frame size of a display screen, an operation for determining the most appropriate zoom magnification index is performed (ST34). The operation automatically determines a zoom magnification index so that a chip, or an object of recognition, is displayed in the screen at a size most suitable for performing an image recognition; in the present exemplary case, it is approximately ½ the screen size. And then, the center point of a chip pictured at the zoom magnification index is aligned to coincide with the origin point (the origin point of optical coordinates system) of the display screen (ST35). In this way, the image data on the screen containing the corner of an aligned chip are stored in the image recognition section 11 as the reference image data for the purpose of location recognition (ST36).

Figure 9:
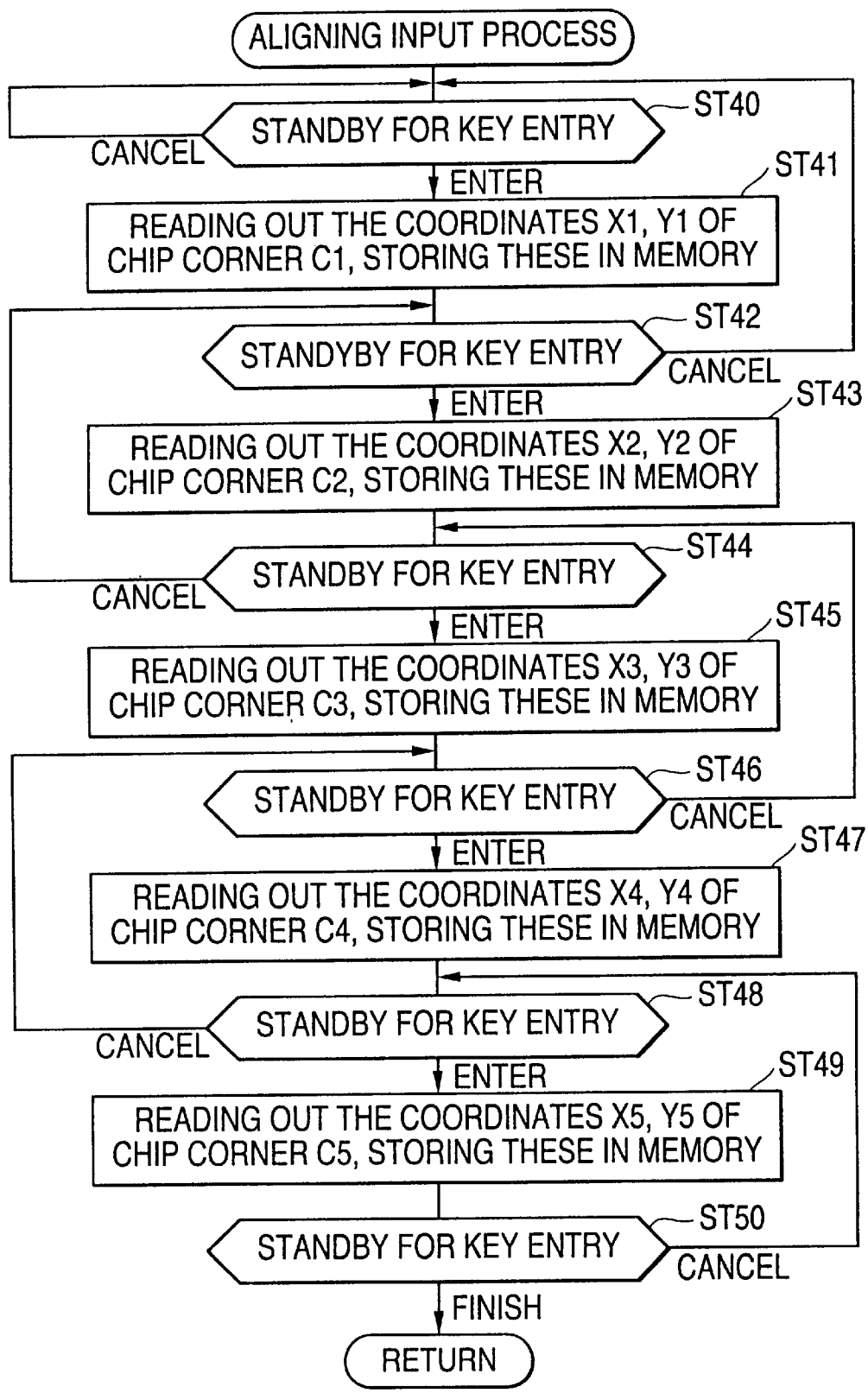
FIG. 9 is a flow chart showing an aligning input procedure in the image recognition unit.
Figure 11:
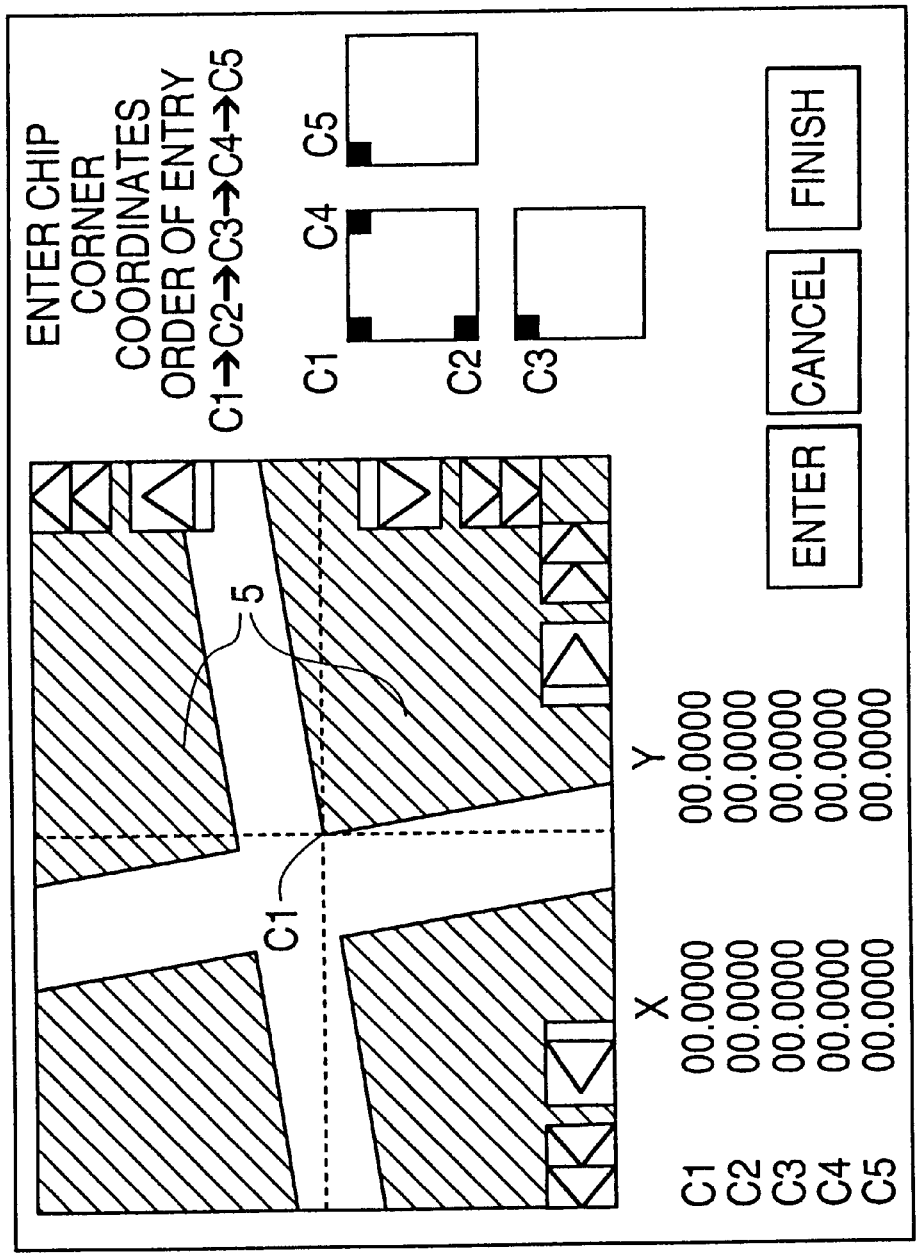

The aligning input processing at the above ST32 is described in line with the flow of FIG. 9, referring to FIG. 10 and FIG. 11. FIG. 10 and FIG. 11 show monitor screens at the aligning input processing; shown inside the frame 60 are the chips 5 pictured at the greatest zoom magnification index. In the frame 60, coordinate axes 61X, 61Y of optical coordinates system are shown; scroll keys 62 manipulate the XY table 2, and the chips 5 are scrolled in the X and Y directions on the screen.

In a space 63 for dialogue, contents of the instruction are shown indicating the operation and the order of entry, the location of chips 5 at the chip corners is also shown in an outline illustration 64. Results of the input are shown in digital value in terms of the optical coordinates system, in a space 65 for data display. The results of input are firmly entered by an entry button 66, or they may be cancelled by a cancellation button 67. Pressing a finish button 68 completes the aligning input processing.

For the aligning input processing, the chip corner Cl of a chip 5 on the screen is carried by the scroll key 62 to the cross point of coordinate axes 61X, 61Y on the display screen of FIG. 10. Referring to the flow in FIG. 9, if the entry button 66 is operated during a state of standby for key entry (ST40), the aligning input processing section 37 reads the current coordinates of the XY table 2 expressed in terms of the mechanical coordinates system from the XY table control section 31, and the value is stored in the alignment point coordinates memory section 48 as the coordinates X1, Y1 of the chip corner Cl (ST41). If there has an input error, or something like that was happened, the stored data of coordinates may be cancelled by the operation of the cancellation button 67.

The same operations conducted at ST1 and ST2 with the chip corner Cl are repeated with respect to four other chip corners C2, C3, C4 and C5 shown in FIG. 10 (ST42–ST50). As a result, three corners of a chip 5 are detected, and the chip size calculation section 35 calculates the chip size data Wx, Wy to be stored in the chip size memory section 46. By a detection of the corner of adjacent chip, the chip aligning pitch calculation section 36 calculates the chip alignment pitch PTx, PTy to be stored in the chip aligning pitch memory section 47.

The process of determining a most appropriate zoom magnification index already described at ST34 will be described further in the following, in line with the flow of FIG. 12. The process is for determining a zoom magnification index n so that a chip 5 is displayed on the screen at approximately half the size of the screen frame. The display size of a chip 5 relative to the screen frame is closely related to the level of recognition accuracy; the greater the display size of chip 5 the higher is the recognition accuracy. On the other hand, if the display size is too large a chip pattern may go out of the frame at a slight shift of the location, rendering the location setting by the recognition impossible. Disposition location of chips 5 on a wafer 4 is normally dispersed, or not uniform, because of various reasons. If the chip display size is too large to be shown within the frame, the operation could be halted frequently by an inability of recognition.

In view of the above described factors, the size of a chip displayed on the screen should fall within a certain appropriate range. The zoom magnification index needs to be determined so that it satisfies the above requirements. The magnification correction processing section 33 determines the zoom magnification index based on the image frame size data Ax, Ay stored in the image frame size memory section 49 and the chip size data Wx, Wy so that the size of chips displayed in the frame meets certain specific conditions. In the present exemplary case, the chip size to be displayed in the frame is specified to be approximately half the frame. The display conditions are not limited to the above described, but they may be specified in the form of a certain range. A preferred range for the chip display size is a range ⅖–⅗ of frame size. Description is made in the following of an exemplary display of the chip at ½ of the frame.

Figure 12:
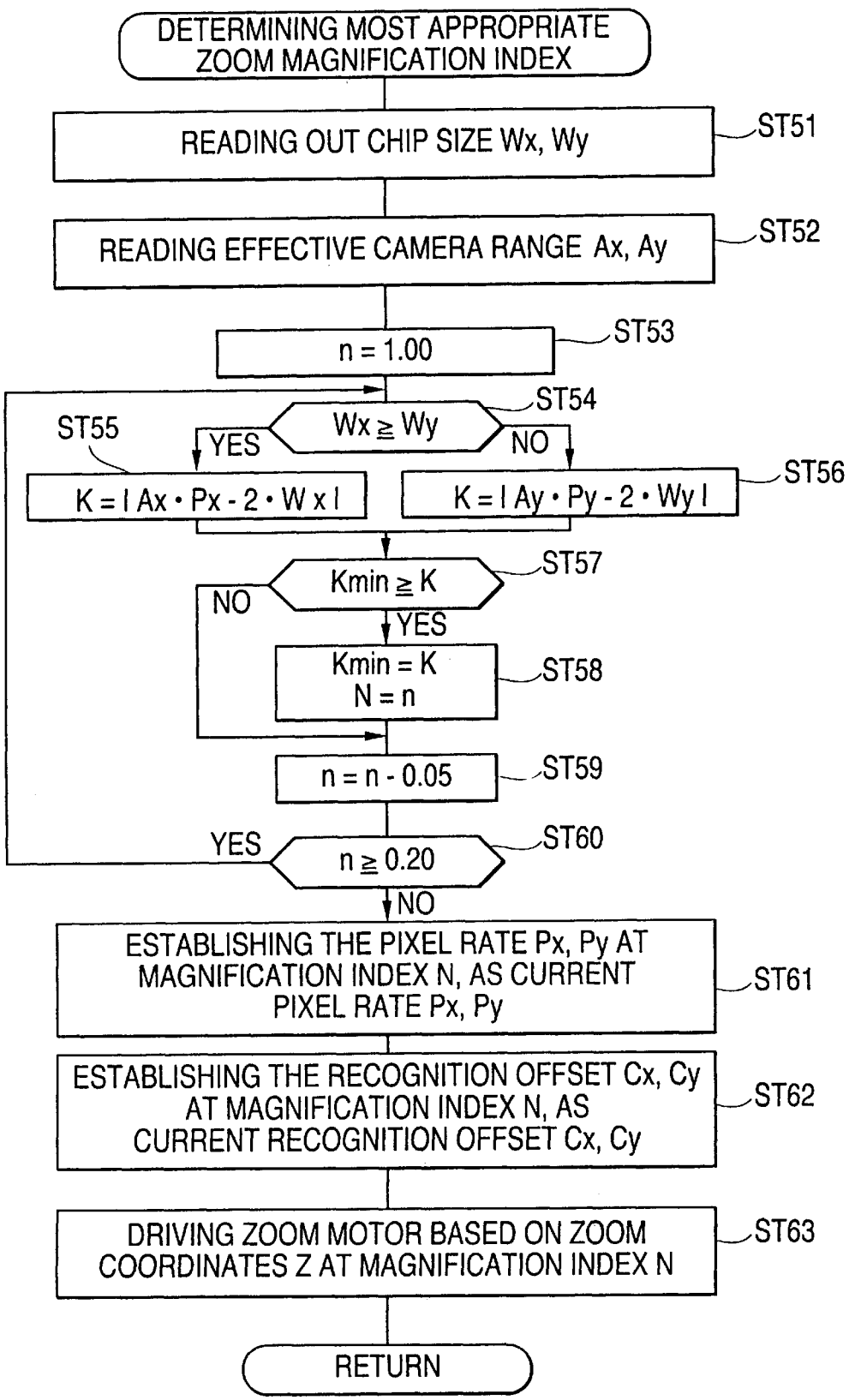
FIG. 12 is a flow chart showing a procedure for selecting an optimum zoom magnification index in the image recognition unit.

Referring to FIG. 12, chip size data Wx, Wy are read out from the chip size data made available at ST33 (ST51). Image frame data Ax, Ay stored in an image frame size memory section 19, which is the image frame size memory means for storing the size of an image frame, are read out (ST52). And then, at respective steps of zoom magnification index n, the difference in the dimensions between a doubled chip size and the image frame size is calculated, for the purpose of specifying a zoom magnification index n at which the difference in the dimensions becomes the smallest. The reason why the chip size is doubled is that the chip display size is required to be ½ that of the image frame.

In the first place, the zoom magnification index n is set at 1.00 (ST53). Which is greater is judged among the above described chip size data in X and Y directions: Wx or Wy (ST54). If the X direction chip size data Wx is greater, a difference between the size of doubled Wx and the image frame size, namely a difference K between the actual dimensions of the image frame derived from the image frame data Ax, Ay expressed in terms of pixel counts multiplied by a pixel rate Px at the corresponding zoom magnification index and the doubled chip size data Wx is sought (K=|Ax·Px−2·Wx|) (ST55). In a case where the Y direction chip size data Wy is greater, a difference K(=|Ay·Py−2·Wy|) is sought through a similar procedure (ST56).

The difference K thus obtained is compared to a predetermined allowable value, Kmin. (ST57). If the difference K is not greater than Kmin., the difference K is established as a new Kmin. and the zoom magnification index n at that time is stored as the magnification index N that provides the Kmin. (ST58). If, at ST57, the difference K is greater than Kmin., zoom magnification index n is set smaller by 0.05 (ST59), and then it is returned to ST54 to repeat the same procedures. Namely, the difference K is compared to Kmin. in order to seek a new Kmin. and a zoom magnification index N that provides the new Kmin. Even after the ST58 is finished, the process proceeds likewise to ST59.

The same procedure is repeated until the zoom magnification index n reaches 0.20 (ST60), and then the above described magnification index N is adopted as the most appropriate zoom magnification index. The pixel rate Px, Py at the magnification index N is established as the current pixel rate PX, PY (ST61) to be stored in the current pixel rate memory section 45. The recognition offset Cx, Cy at the magnification index N is established likewise as the current recognition offset CX, CY (ST62) to be stored in the current recognition offset memory section 44. The zoom motor 10 is driven based on the zoom coordinates Z at the magnification index N (ST63). Through the above described procedure, the chip 5, or the object of recognition, is pictured through a camera to be displayed on the screen at a zoom magnification index under which the chip is shown in the screen at a size that is closest to the size, ½ that of the frame size, or a size that is most suitable for performing the location recognition procedure.

Figure 13:
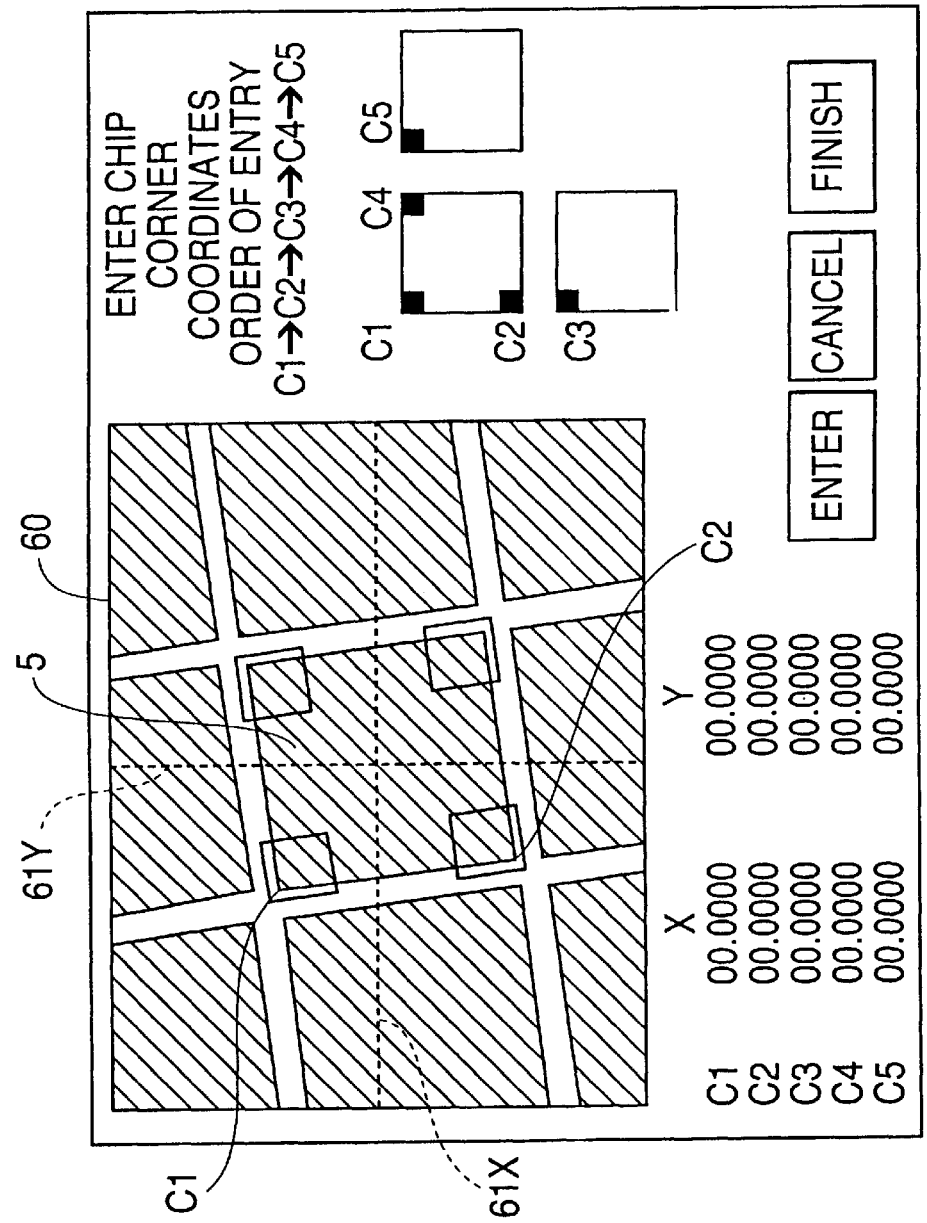
FIG. 13 shows a display screen of the image recognition unit in the above procedure.

Instead of conducting the above described procedure ST52–ST60 at each occasion of teaching, one may seek in advance the most appropriate zoom magnification index N corresponding to each of the chip sizes to have them tabulated in the form of a table of most appropriate zoom magnification indices, and decide, as soon as a chip size is given, a magnification index N in consultation with the table. FIG. 13 shows an image of chip 5 pictured at the most appropriate zoom magnification index N, aligned to the origin of optical coordinates system, like at ST35 of FIG. 8. Taking the image in as the reference image completes a teaching process.

Now, the position setting of chip 5 in chip supply section and the bonding of the chip 5 on a substrate are described with reference to FIG. 14–FIG. 18. Firstly, the functions of position setting and bonding are described referring to FIG. 16. FIG. 16 is an excerption of those related with the position setting and the bonding from the function block chart of FIG. 2.

In FIG. 16, a chip 5 on chip supply section 1 is pictured through camera 8, and the chip location is recognized by image recognition section 11. Recognition results at the image recognition section 11 are delivered to a conversion process section 49, or the coordinates conversion means, as location information on an optical coordinates system in the form of pixel data. Data delivered to the conversion process section 49 include the recognition offset CX, CY and the pixel rate PX, PY corresponding to a most appropriate zoom magnification index N determined in accordance with the size of chip 5, which data are supplied from the current recognition offset memory section 44 and the current pixel rate memory section 45 of memory section 19.

The location information indicating displacement of a chip 5 is converted into actual dimensions, which are sent to the XY table control section 31. The XY table control section 31 controls the XY table 2 of chip supply section 1 after correcting the displacement in accordance with the location information converted into actual dimensions, while referring to chip alignment data of chip aligning pitch memory section 47. In synchronization with the XY table control section 31, a bonding head control section 50 controls operation of bonding head 16. Thus the XY table control section 31 and the bonding head control section 50 constitute the control means for controlling a die bonder. A chip 5 on the chip supply section 1 is bonded on a substrate 15 by the bonding head 16. Respective steps are described in line with the flow shown in FIG. 14 and FIG. 15.

Figure 14:
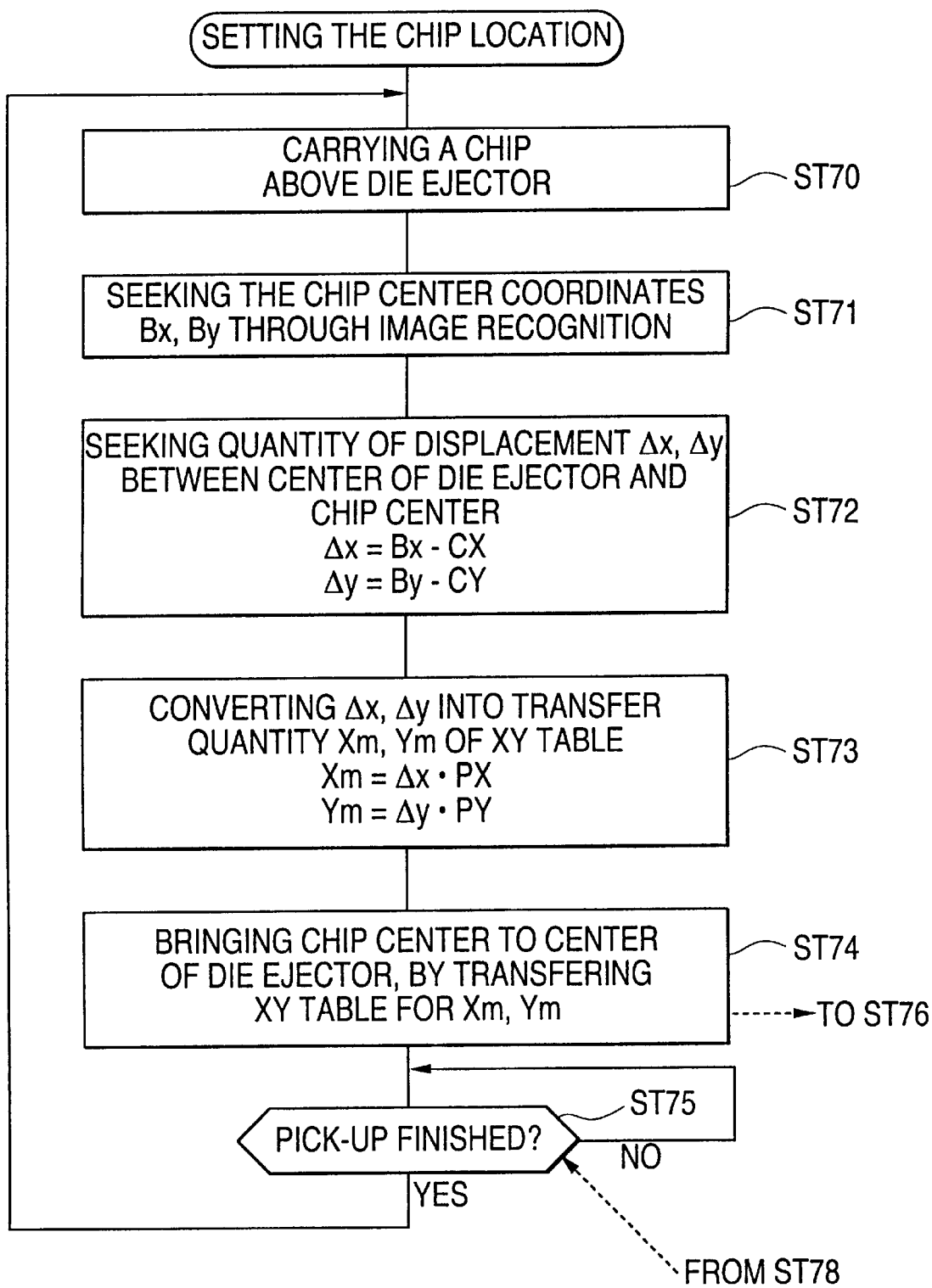
FIG. 14 and FIG. 15 are flow charts showing, respectively, chip aligning and chip bonding operations in the automatic assembly apparatus.
Figure 17:
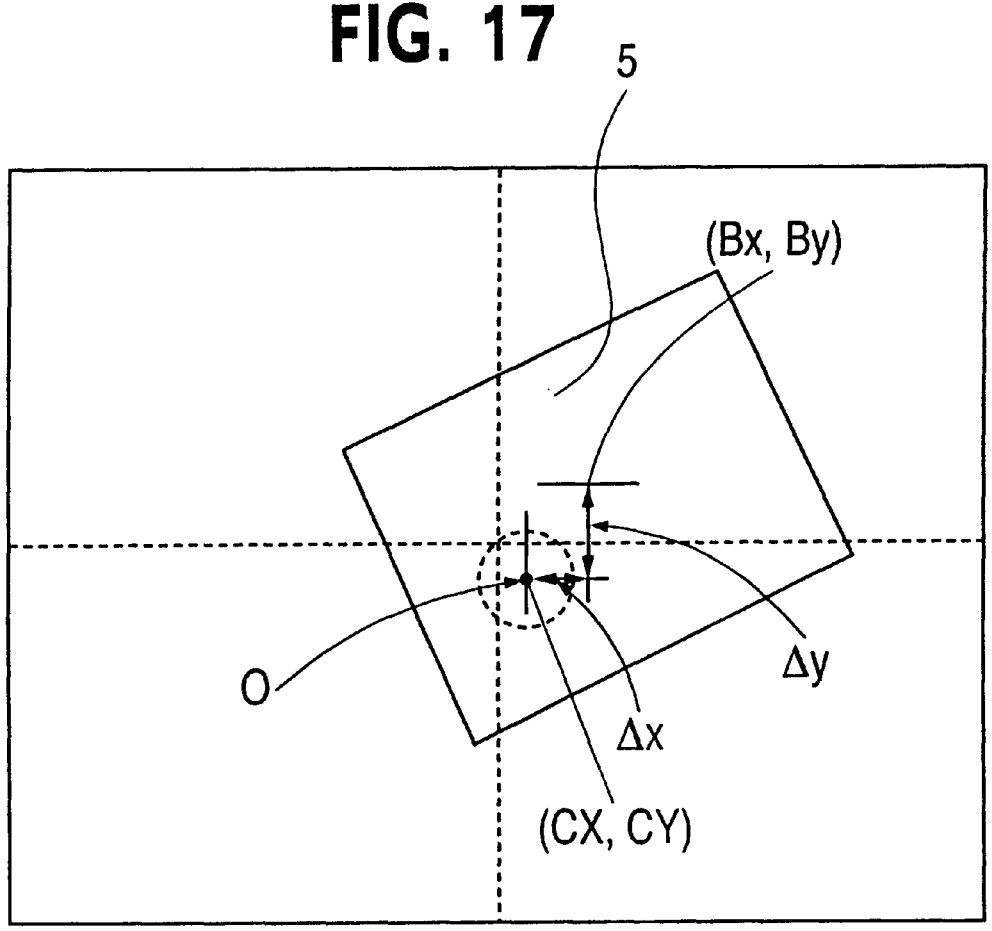
FIG. 17 shows a display screen of the image recognition unit.

Referring to FIG. 14, among the chips 5 disposed on a wafer ring 3 of chip supply section 1, a chip 5 targeted for the pick up action is carried to a location above a die ejector 6 (ST70). A camera 8 pictures the chip 5 and seeks the center coordinates (Bx, By) of the chip 5 through image recognition (ST71). The center coordinates (Bx, By) of the chip 5 are delivered as the value expressed in terms of the coordinates system of the image recognition unit to the conversion process section 49. The quantity of displacement $\Delta x$, $\Delta y$ between the center 0 of die ejector 6 and the center of chip 5, is sought; namely, the center coordinates of the chip 5 expressed in terms of the mechanical coordinates system of die bonder (ST72). As illustrated in FIG. 17, the quantity of displacement $\Delta x$, $\Delta y$ is represented by the center coordinates of chip 5 Bx, By obtained at ST71 and the current recognition offset CX, CY as follows: $\Delta x = Bx - Cx$, $\Delta y = By - Cy$.

Then, the quantity of displacement $\Delta x$, $\Delta y$ is converted by the conversion process section 49 into actual dimensional quantity of shift, Xm, Ym, on the XY table 2 (ST73). The quantity of shift, Xm, Ym, is represented. with said $\Delta x$, $\Delta y$ multiplied by the pixel rate PX, PY: $Xm = \Delta x \cdot PX$, $Ym = \Delta y \cdot PY$ The XY table 2 is moved by the quantity of shift Xm, Ym, and the center of chip 5 is brought on the center of die ejector 6 (ST74).

The chip 5 thus positioned is pushed up by the die ejector 6 to be picked up by bonding head 16, and bonded on the substrate 15. A location alignment section 1 judges whether the chip 5 was picked up, or not (ST75); if the pick-up was finished, the process returns to ST70 to proceed to the positioning process for a new chip 5.

Figure 15:
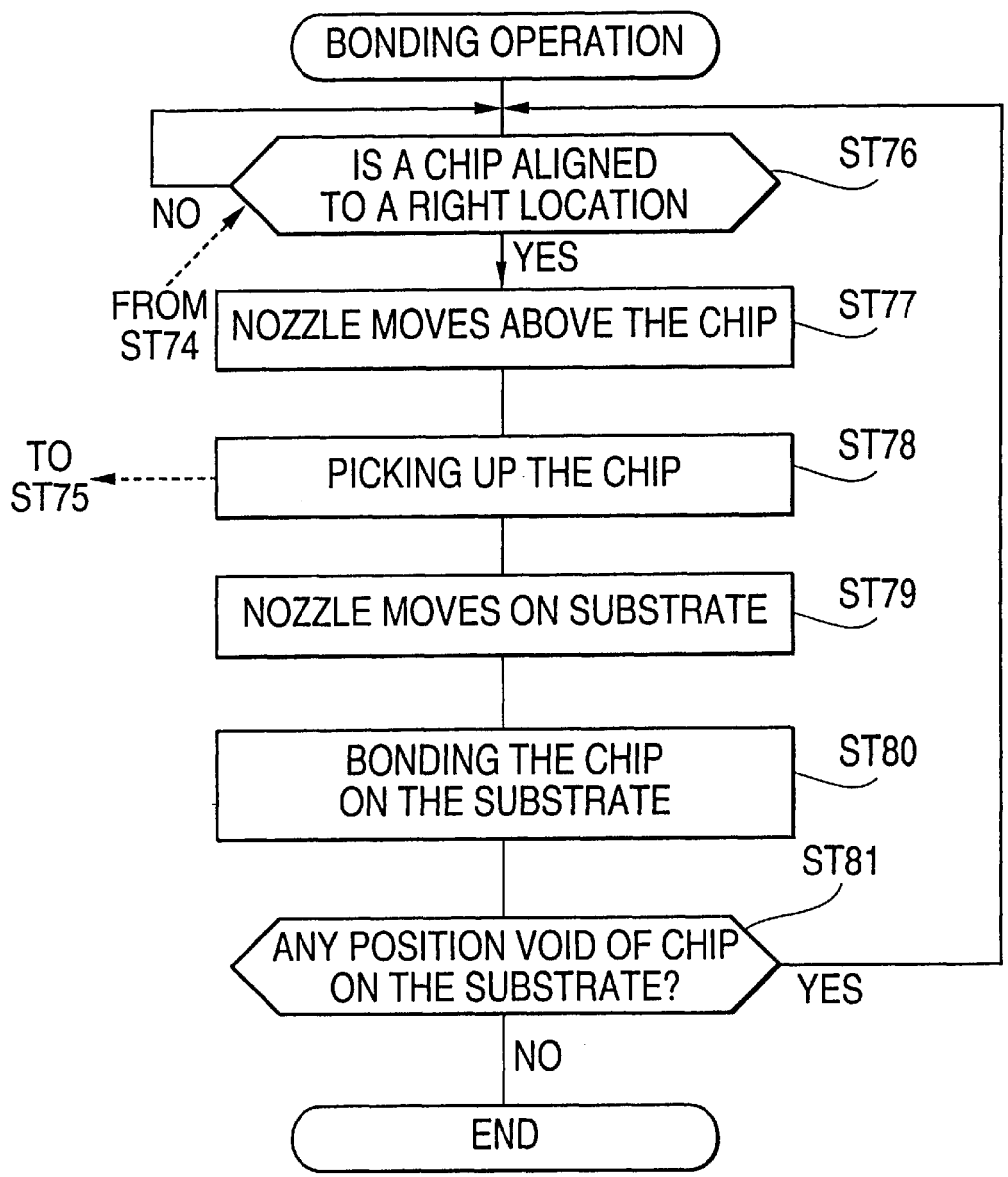
Figure 16:
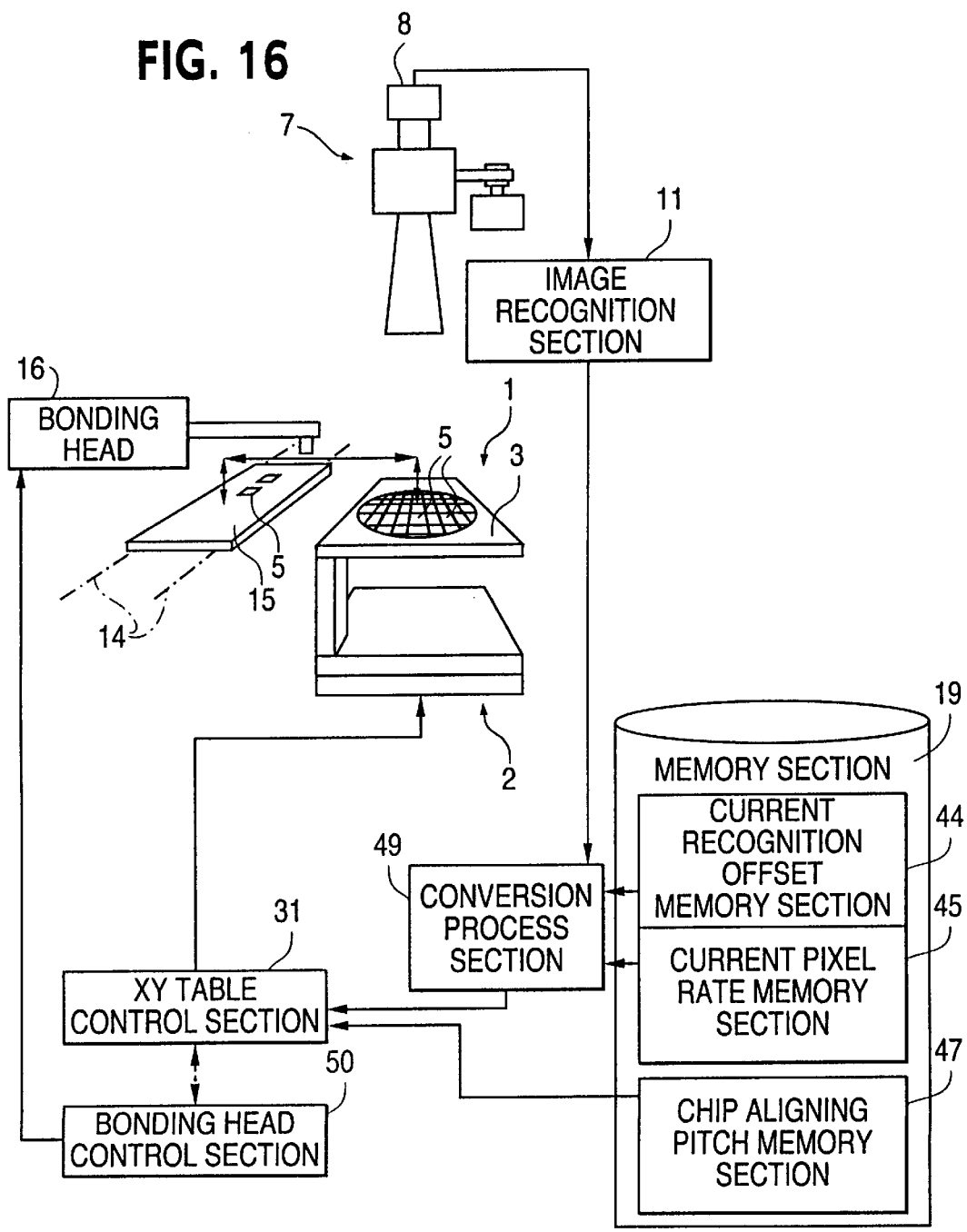
FIG. 16 illustrates process blocks of respective functions in the automatic assembly apparatus.

Next, a bonding operation, which is conducted in parallel with the chip location setting, is described in accordance with the flow of FIG. 15. Whether a chip 5 is positioned to a correct location, or not, is confirmed by a completion signal issued at ST74 shown in FIG. 15 (ST76). If the chip 5 is confirmed to have been placed on a correct location, a nozzle 16a of bonding head 16 moves to a place above the chip 5, which chip has been placed in a correct location (ST77). The nozzle 16a picks up the chip 5 (ST78).

Figure 18A:
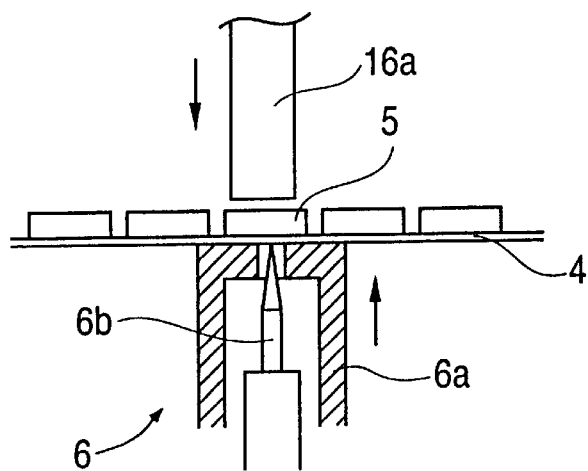
FIG. 18(a), FIG. 18(b) and FIG. 18(c) are magnified views of a key portion of the automatic assembly apparatus.
Figure 18B:
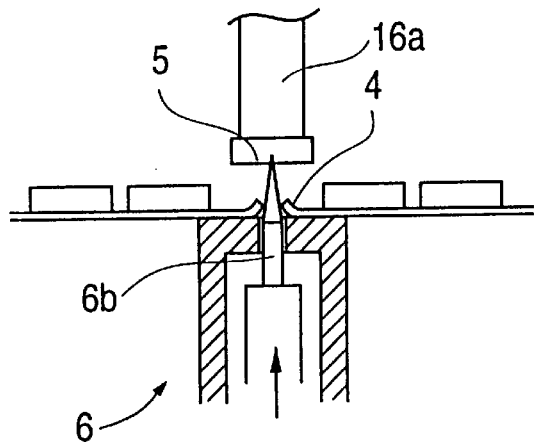

The pick-up operation is described with reference to FIG. 18. A chip 5 disposed on a wafer sheet 4 has been positioned to be aligned with the center of die ejector 6, as shown in FIG. 18(a). The die ejector 6 is elevated to get in touch with the bottom surface of the wafer sheet 4. The nozzle 16a is lowered towards the chip 5. Then, as shown in FIG. 18(b), an ejector pin 6b pushes up the chip 5 breaking the wafer sheet 4, the chip 5 is sucked to the nozzle 16a.

Figure 18C:
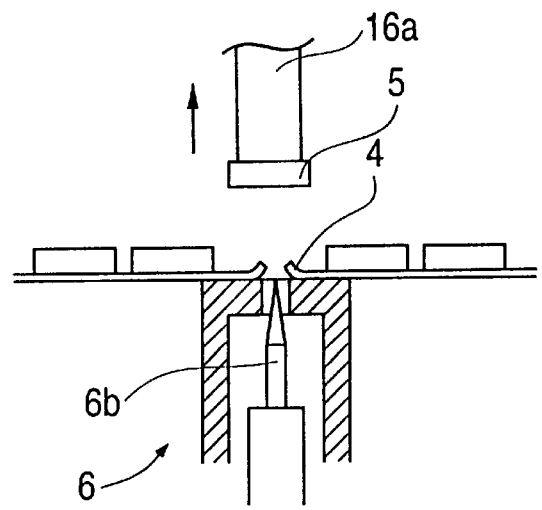

The ejector pin 6b goes down, while the nozzle 16a sucking the chip 5 goes up, as illustrated in FIG. 18(c). This completes the operation of picking-up the chip 5, and a pick-up completion signal is issued. The signal is used for the confirmation signal at ST75 of FIG. 14.

The nozzle 16a moves to a place above the substrate 15 (ST79), and descends to bond the chip 5 on the substrate 15 (ST80). Whether there is still a position on the substrate 15 left unbonded with a chip is judged (ST81); if there is such an unbonded position on the substrate the process returns to ST76 for repeating the bonding operation. A confirmation that there is no such vacant position left unbonded completes the bonding operation.

As described in the foregoing, in an image recognition unit having a zoom optical system for recognizing different objects of different dimensions, the operation of seeking an appropriate pixel rate and recognition offset in accordance with the size of an object of recognition that was conducted at each time when zoom magnification index is changed can now be eliminated; by specifying the zoom coordinates, for each of the zoom magnification indices, that provide an approximated pixel rate falling within an allowable range with respect to designed reference pixel rate, and storing the current data on pixel rate and recognition offset in a memory maintaining linkage to the zoom magnification index. By so doing, appropriate pixel rate and recognition offset data can be immediately read out and location information provided in terms of an optical coordinates system is converted for enabling, at any time, a precise location correction through image recognition.

Storing data on the size of a recognition object and the size of a frame for displaying an image of recognition object in a memory, and, thereby, automatically setting an appropriate zoom magnification index so that the object of recognition is displayed in the frame with a size most suitable to performing the image recognition, eliminates a burden of an operator for setting a magnification index by hand.

Thus, such operations as determination of an appropriate zoom magnification index, setting of recognition offset and pixel rate corresponding to respective zoom magnification indices, which required substantial work hours and personal skills of an operator, are performed automatically. This provides a superior image recognition unit for an automatic assembly apparatus. In the automatic assembly apparatus, the dispersion in the contents of operation due to manual setting by the hand of individual operators, the occurrence of such dispersion was unavoidable when data resetting was conducted by the hand of operators at their own discretion. A superior and stable image recognition may be provided in accordance with the present invention.

What is claimed is:

1. An automatic assembly apparatus having a mechanical coordinate system, for use with an object of recognition, said apparatus comprising:

an image recognition unit operable to produce recognition results, said image recognition unit including an optical coordinate system, and a zoom optical system operable to carry out a location alignment based on the recognition results, said zoom optical system having a variable zoom magnification index;

a memory section operable to store zoom magnification indices of said zoom optical system and a plurality of recognition offset data, which specify a relationship in the relative location between the optical coordinate system of said image recognition unit and the mechanical coordinate system, corresponding to each of the zoom magnification indices, respectively;

a selection section operable to select one recognition offset datum, among the plurality of recognition offset data stored in said memory section, in accordance with the zoom magnification index of said zoom optical system;

a camera operable to obtain an image of the object of recognition;

a recognition process section operable to recognize the image of the object of recognition obtained by said camera and to output, as a result of recognition, location information of the object of recognition in terms of the optical coordinate system;

a coordinate conversion section operable to convert the location information outputted by said recognition process section into mechanical coordinate location information, in terms of the mechanical coordinate system, based on the recognition offset datum selected by said selection section; and a control section operable to control said automatic assembly apparatus in accordance with the mechanical coordinate location information.

2. The automatic assembly apparatus of claim 1, wherein said selection section is operable to determine the zoom magnification index of said zoom optical system and to select a recognition offset datum corresponding to the zoom magnification index.

3. The automatic assembly apparatus of claim 2, wherein said selection section is operable to determine the zoom magnification index of said zoom optical system based on dimensions of the object of recognition.

4. An automatic assembly apparatus having a mechanical coordinate system, for use with an object of recognition, said apparatus comprising:

an image recognition unit operable to produce recognition results, said image recognition unit including an optical coordinate system, and a zoom optical system operable to carry out a location alignment based on the recognition results, said zoom optical system having a variable zoom magnification index;

a memory section operable to store zoom magnification indices of said zoom optical system, a plurality of recognition offset data, which specify a relationship in the relative location between the optical coordinate system of said image recognition unit and the mechanical coordinate system, corresponding to each of the zoom magnification indices, respectively, and a plurality of pixel rates, which are dimension conversion coefficients between the optical coordinate system and the mechanical coordinate system, corresponding to each of the zoom magnification indices, respectively;

a selection section operable to select one recognition offset datum, among the plurality of recognition offset data stored in said memory section, and one pixel rate, among the plurality of pixel rates stored in said memory section, in accordance with the zoom magnification index of said zoom optical system;

a camera operable to obtain an image of the object of recognition;

a recognition process section operable to recognize the image of the object of recognition obtained by said camera and to output, as a result of recognition, at least location information of the object of recognition in terms of the optical coordinate system;

a coordinate conversion section operable to convert the location information outputted by said recognition process section into mechanical coordinate location information, in terms of the mechanical coordinate system, based on the recognition offset datum and pixel rate selected by said selection section; and a control section operable to control said automatic assembly apparatus in accordance with the mechanical coordinate location information.

5. The automatic assembly apparatus of claim 4, wherein said selection section is operable to determine the zoom magnification index of said zoom optical system and to select a recognition offset datum corresponding to the zoom magnification index.

6. The automatic assembly apparatus of claim 5, wherein said selection section is operable to determine the zoom magnification index of said zoom optical system based on dimensions of the object of recognition.

7. A method of automatic assembly using a mechanical coordinate system, for use with an object of recognition and an image recognition unit including an optical coordinate system and a zoom optical system, having a variable zoom magnification index, operable to carry out a location alignment based on recognition results produced by the image recognition unit, said method comprising:

storing, in a memory section, zoom magnification indices of the zoom optical system and a plurality of recognition offset data, which specify a relationship in the relative location between the optical coordinate system of the image recognition unit and the mechanical coordinate system, corresponding to each of the zoom magnification indices, respectively;

selecting, in a selection section, one recognition offset datum, among the plurality of recognition offset data stored in the memory section, in accordance with the zoom magnification index of the zoom optical system;

recognizing, in a recognition process section, an image of the object of recognition obtained by a camera and outputting, as a result of recognition, location information of the object of recognition in terms of the optical coordinate system;

converting, in a coordinate conversion section, the outputted location information into mechanical coordinate location information, in terms of the mechanical coordinate system, based on the selected recognition offset datum; and controlling, in a control section, the automatic assembly in accordance with the mechanical coordinate location information.

8. The method of automatic assembly of claim 7, further comprising:

determining, in the selection section, the zoom magnification index of the zoom optical system; and selecting, in the selection section, a recognition offset datum corresponding to the zoom magnification index.

9. The method of automatic assembly of claim 8, further comprising:

determining, in the selection section, the zoom magnification index of the zoom optical system based on dimensions of the object of recognition.

10. A method of automatic assembly using a mechanical coordinate system, for use with an object of recognition and an image recognition unit including an optical coordinate system and a zoom optical system, having a variable zoom magnification index, operable to carry out a location alignment based on recognition results produced by the image recognition unit, said method comprising:

storing, in a memory section, zoom magnification indices of the zoom optical system, a plurality of recognition offset data, which specify a relationship in the relative location between the optical coordinate system of the image recognition unit and the mechanical coordinate system, corresponding to each of the zoom magnification indices, respectively, and a plurality of pixel rates, which are dimension conversion coefficients between the optical coordinate system and the mechanical coordinate system, corresponding to each of the zoom magnification indices, respectively;

selecting, in a selection section, one recognition offset datum, among the plurality of recognition offset data stored in the memory section, and one pixel rate, among the plurality of pixel rates stored in the memory section, in accordance with the zoom magnification index of the zoom optical system;

recognizing, in a recognition process section, the image of the object of recognition obtained by a camera and outputting, as a result of recognition, at least location information of the object of recognition in terms of the optical coordinate system;

converting, in a coordinate conversion section, the outputted location information into mechanical coordinate location information, in terms of the mechanical coordinate system, based on the selected recognition offset datum and pixel rate; and controlling, in a control section, the automatic assembly in accordance with the mechanical coordinate location information.

11. The method of automatic assembly of claim 10, further comprising:

determining, in the selection section, the zoom magnification index of the zoom optical system; and selecting, in the selection section, a recognition offset datum corresponding to the zoom magnification index.

12. The method of automatic assembly of claim 11, further comprising:

determining, in the selection section, the zoom magnification index of the zoom optical system based on dimensions of the object of recognition.

\* \* \* \* \*